United States Patent
Kawai et al.

(10) Patent No.: US 8,132,658 B2
(45) Date of Patent: Mar. 13, 2012

(54) SEAT HAVING A POSITION ADJUSTMENT DEVICE

(75) Inventors: Masahiro Kawai, Iwata (JP); Hiroyuki Suzuki, Fujisawa (JP)

(73) Assignees: NTN Corporation, Osaka (JP); Shiroki Corporation, Kanagawa (JP)

( * ) Notice: Subject to any disclaimer, the term of this patent is extended or adjusted under 35 U.S.C. 154(b) by 724 days.

(21) Appl. No.: 12/225,587

(22) PCT Filed: Mar. 29, 2007

(86) PCT No.: PCT/JP2007/056894
§ 371 (c)(1),
(2), (4) Date: Sep. 25, 2008

(87) PCT Pub. No.: WO2007/114263
PCT Pub. Date: Oct. 11, 2007

(65) Prior Publication Data
US 2009/0272613 A1    Nov. 5, 2009

(30) Foreign Application Priority Data
Mar. 31, 2006  (JP) .................................. 2006-098613

(51) Int. Cl.
*F16D 41/08* (2006.01)
*F16D 15/00* (2006.01)
*B60N 2/16* (2006.01)

(52) U.S. Cl. ........... 192/223.2; 192/15; 192/19; 192/38; 192/44; 297/344.15

(58) Field of Classification Search ............... 192/223.2, 192/19; 297/344.12
See application file for complete search history.

(56) References Cited

U.S. PATENT DOCUMENTS

| | | | |
|---|---|---|---|
| 5,248,017 A | 9/1993 | Schwarzbich | |
| 6,481,557 B2 * | 11/2002 | Denis | 192/223.2 |
| 6,955,251 B2 * | 10/2005 | Kurita et al. | 192/19 |
| 2003/0019708 A1 | 1/2003 | Goto et al. | |

FOREIGN PATENT DOCUMENTS

DE    91 01 110    4/1992

(Continued)

OTHER PUBLICATIONS

International Preliminary Report on Patentability mailed Oct. 30, 2008 for International Application No. PCT/JP2007/056894. Written Opinion of the International Searching Authority mailed Oct. 30, 2008 for International Application No. PCT/JP2007/056894.
Supplementary European Search Report dated Nov. 5, 2010 in corresponding European Application No. 07740332.7.
International Search Report mailed Apr. 24, 2007 for International Application No. PCT/JP2007/056894.

*Primary Examiner* — Richard M. Lorence
(74) *Attorney, Agent, or Firm* — Wenderoth, Lind & Ponack, L.L.P.

(57) ABSTRACT

Provided is a seat where pumping operation of a lever of the seat not only rotates an output member by inching but also, when a load in the operation direction of the lever is applied to the output side member, rotates it at one stroke in that direction. A seat adjustment device of the seat has a clutch unit (X) provided between the lever and a rotation member of a movement mechanism. The clutch unit (X) has a lever side clutch section (11) which is provided on the input side and controls, through lever operation, transmission/interruption of rotational torque to the output side, a brake side clutch section (12) provided on the output side, which transmits input torque from the lever side clutch section (11) to the output side, and interrupts reverse input torque from the output side, and a rotation control clutch section (13) which is disposed adjacent to the brake side clutch section (12), allows a pinion shaft (28) of the brake side clutch section (12) to rotate by inching through pumping operation where the lever of the lever side clutch section (12) is rotated in one direction, and makes the pinion shaft (28) rotatable through a single operation in which the lever is rotated in the opposite direction.

14 Claims, 24 Drawing Sheets

FOREIGN PATENT DOCUMENTS

| | | |
|---|---|---|
| EP | 0 631 901 | 1/1995 |
| JP | 2001-140948 | 5/2001 |
| JP | 2001-140949 | 5/2001 |
| JP | 2002-240601 | 8/2002 |
| JP | 2003-93187 | 4/2003 |
| JP | 2003-106346 | 4/2003 |
| JP | 2006-083983 | 3/2006 |

* cited by examiner (a)

(b)

(a)

(b)

(c)

(a)

(b)

(c)

(a)

(b)

(c)

SEAT HAVING A POSITION ADJUSTMENT DEVICE

BACKGROUND OF THE INVENTION

I. Technical Field

The present invention relates to a seat having a seat adjustment device into which there is incorporated a clutch unit having a lever side clutch section transmitting operational torque from the input side to the output side and a brake side clutch section transmitting rotational torque from the input side to the output side and shutting off reverse input torque from the output side.

II. Description of the Related Art

Generally speaking, in a clutch unit using engagement members such as cylindrical rollers or balls, a clutch section is arranged between the input side member and the output side member, and, in the clutch section, the engagement members such as cylindrical rollers or balls are engaged/disengaged with/from a wedge gap formed between the input side member and the output side member, thereby controlling the transmission/interruption of the input torque.

A clutch unit of this type is sometimes incorporated, for example, into a seat adjustment device which vertically moves a seat through lever operation to be used (see, for example, JP 2003-93187 A and JP 2002-240601 A). This clutch unit is equipped with a lever side clutch section transmitting rotational torque from the input side to the output side and a brake side clutch section transmitting rotational torque from the input side to the output side and shutting off reverse input torque from the output side.

In the seat adjustment device, an input side member of the lever side clutch section is coupled to a lever, and an output side member of the brake side clutch section is coupled to a rotary member vertically moving the seat. By performing a pumping operation on the lever upwardly or downwardly, the rotational torque is transmitted to the output side member to rotate the rotary member by inching, whereby the seat is vertically moved, thus enabling the seat surface adjustment thereof.

When the occupant is seated on the seat, even if rotational torque is applied to the output side member via the rotary member, the output side member is locked by the reverse input rotational torque thereof, thus preventing the input side member from rotating.

DISCLOSURE OF THE INVENTION

Problem to be Solved by the Invention

As described above, in the clutch unit as disclosed in JP 2003-93187 A and JP 2002-240601 A, it is a present situation that a pumping operation is performed on the lever coupled to the input side member of the lever side clutch section, whereby the rotary member coupled to the output side member of the brake side clutch section is caused to rotate by inching.

However, in this clutch unit, the rotation by inching of the output side member through the pumping operation of the lever is sometimes felt to be rather complicated. In such cases, there is a demand for a one-stroke rotation of the output side member through a single lever operation.

The present invention has been made in view of the above-mentioned problem in the prior art. It is an object of the present invention to provide a seat into which there is incorporated a clutch unit which not only rotates by inching the output side member through pumping operation of the lever but, when a load is being applied to the lever operating direction, can also rotate the output side member at one stroke in that direction.

As a technological means to achieve the above-mentioned object, the present invention is characterized by a seat having a seat adjustment device for performing position adjustment on a seating seat through torque input from a lever, the seat adjustment device including: a lever, a movement mechanism enabling adjustment movement of a desired portion of the seating seat, and a clutch unit provided between the lever and a rotary member of the movement mechanism, in which the clutch unit includes a lever side clutch section provided on an input side and adapted to control transmission/interruption of rotational torque to an output side through lever operation, a brake side clutch section provided on the output side and adapted to transmit input torque from the lever side clutch section to the output side and to interrupt reverse input torque from the output side, and a rotation control clutch section which is disposed adjacent to the brake side clutch section and which rotates by inching an output side member of the brake side clutch section through pumping operation in which the lever of the lever side clutch section is rotated in one direction and makes an output side member of the brake side clutch section rotatable through a single operation in which the lever is rotated in the opposite direction.

Regarding the lever operating direction described above, assuming that the "one direction" is counterclockwise, the "opposite direction" is clockwise.

In the seat of the present invention, there is incorporated a clutch unit in which the brake side clutch section is equipped with a rotation control clutch section which rotates the output side member of the brake side clutch section by inching through pumping operation in which the lever of the lever side clutch section is rotated in one direction, and makes the output side member of the brake side clutch section rotatable through a single operation of rotating the lever in the opposite direction, whereby it is not only possible to rotate the output side member to rotate by inching through pumping operation of the lever in one direction but also to make the output side member rotatable through a single operation of the lever in the opposite direction, so that, when a load is being applied in the lever operating direction, it is possible to rotate the output side member at one stroke.

Here, the "pumping operation of the lever in one direction" means the operation of rotating the lever repeatedly in one direction a plurality of times. The "single operation of the lever in the opposite direction" means the operation of rotating the lever only once in the opposite direction. Further, unlike the above-mentioned rotation by inching, the "one-stroke rotation" means that the member rotates continuously.

The rotation control clutch section of the clutch unit may have a control means which divide the output side member into two and control transmission/interruption of torque between one output side member and the other output side member. Further, the rotation control clutch section, a tapered roller may be provided between one output side member and the other output side member so as to allow engagement/disengagement, and the control means may control the engagement/disengagement of the tapered roller.

In this rotation control clutch section, when the tapered roller is engaged between the two output side members by the control means, it is possible to rotate the output side members by inching through pumping operation of the lever in one direction, and when the tapered roller is detached from between the two output side members by the control means, the torque transmission is cut off between the two output side members, so that one output side member which is arranged at the output end is made rotatable through a single operation of the lever in one direction.

In the above-mentioned rotation control clutch section, it is preferred that the tapered roller be provided so as to be axially movable between one output side member and the other output side member, and can undergo engagement/disengagement through axial movement in a wedge gap formed so as to extend in the axial direction. Further, it is preferred that the control means include a retainer having a torque cam portion moving the tapered roller in the axial direction, and an input side member of the brake side clutch section having a torque cam portion in phase with the torque cam portion of the retainer. Further, it is preferred that, in a neutral state of the brake side clutch section, a clearance angle made by two contact points of the input side member and the output side member with respect to a rotation center, and a clearance angle made by two contact points of the input side member and an engagement member with respect to the rotation center, be larger in one rotating direction than in the other rotating direction.

The lever side clutch section of the clutch unit may include an input side member to which torque is input through lever operation, an output side member from which torque is output, a plurality of engagement members controlling transmission/interruption of input torque from the input side member through engagement/disengagement between the input side member and the output side member, a retainer retaining the engagement members at predetermined circumferential intervals, a stationary side member constrained in its rotation, a first elastic member which is provided between the retainer and the stationary side member and which accumulates elastic force with the input torque from the input side member and restores the retainer to the neutral state with the accumulated elastic force through releasing of the input torque, and a second elastic member which is provided between the input side member and the stationary side member and which accumulates elastic force with the input torque from the input side member and restores the input side member to the neutral state with the accumulated elastic force through releasing of the input torque.

The brake side clutch section of the clutch unit may include an input side member to which torque is input, an output side member from which torque is output, a stationary side member constrained in its rotation, a pair of engagement members which are arranged in a gap between the stationary side member and the output side member, and control transmission of input torque from the input side member and interruption of reverse input torque from the output side member through engagement/disengagement between the stationary side member and the output side member, and an elastic member which is provided between the pair of engagement members, and imparts a repulsive urging force to the engagement members.

According to the present invention, there is incorporated a clutch unit equipped with a rotation control clutch section which rotates the output side member of the brake side clutch section by inching through pumping operation in which the lever of the lever side clutch section is rotated in one direction, and which makes the output side member of the brake side clutch section rotatable through a single operation of rotating the lever in the opposite direction, whereby it is not only possible to rotate the output side member by inching through pumping operation of the lever in one direction but also to make the output side member rotatable through a single operation of the lever in the opposite direction, so that, when a load is being applied in that lever operating direction, it is possible to rotate the output side member at one stroke through a single lever operation, thereby eliminating the complication in the lever operation to thereby achieve an improvement in terms of the lever operability of the seat.

BRIEF DESCRIPTION OF DRAWINGS

FIGS. 11(a) to (c) are diagrams showing a retainer of FIG. 1, of which FIG. 11(a) is a sectional view, taken along the line F-O-F of FIG. 11(b), and FIG. 11(b) is a right-hand side view of FIG. 11(a).

FIGS. 13 (a) to (c) are diagrams showing an inner ring of FIG. 1, of which FIG. 13(a) is a left-hand side view of FIG. 13(c), FIG. 13(b) is a sectional view taken along the line H-H of FIG. 13(c), and FIG. 13(c) is a sectional view taken along the line G-O-G of FIG. 13(b).

FIG. 21 is a diagram showing the lever operation neutral state when rotation by inching is effected through pumping operation of the lever, of which FIG. 21(a) is a main portion enlarged sectional view taken along the line D-D of FIG. 1, FIG. 21(b) is a main portion enlarged sectional view taken along the line C-C of FIG. 1, and FIG. 21(c) is an explanatory view showing the torque cam portion of the retainer and the torque cam portion of the inner ring.

FIG. 22 is a diagram showing the lever operation starting state when rotation by inching is effected through pumping operation of the lever, of which FIG. 22(a) is a main portion enlarged sectional view taken along the line D-D of FIG. 1, FIG. 22(b) is a main portion enlarged sectional view taken along the line C-C of FIG. 1, and FIG. 22(c) is an explanatory view showing the torque cam portion of the retainer and the torque cam portion of the inner ring.

FIG. 23 is a diagram showing the lever operating state when rotation by inching is effected through pumping operation of the lever, of which FIG. 23(a) is a main portion enlarged sectional view taken along the line D-D of FIG. 1, FIG. 23(b) is a main portion enlarged sectional view taken along the line C-C of FIG. 1, and FIG. 23(c) is an explanatory view showing the torque cam portion of the retainer and the torque cam portion of the inner ring.

FIG. 25 is a diagram showing the lever operation neutral state when a one-stroke rotation is effected through a single operation of the lever, of which FIG. 25(a) is a main portion enlarged sectional view taken along the line D-D of FIG. 1, FIG. 25(b) is a main portion enlarged sectional view taken along the line C-C of FIG. 1, and FIG. 25(c) is an explanatory view showing the torque cam portion of the retainer and the torque cam portion of the inner ring.

FIG. 26 is a diagram showing the lever operation starting state when a one-stroke rotation is effected through a single operation of the lever, of which FIG. 26(a) is a main portion enlarged sectional view taken along the line D-D of FIG. 1, FIG. 26(b) is a main portion enlarged sectional view taken along the line C-C of FIG. 1, and FIG. 26(c) is an explanatory view showing the torque cam portion of the retainer and the torque cam portion of the inner ring.

DETAILED DESCRIPTION OF THE INVENTION

Figure 1:
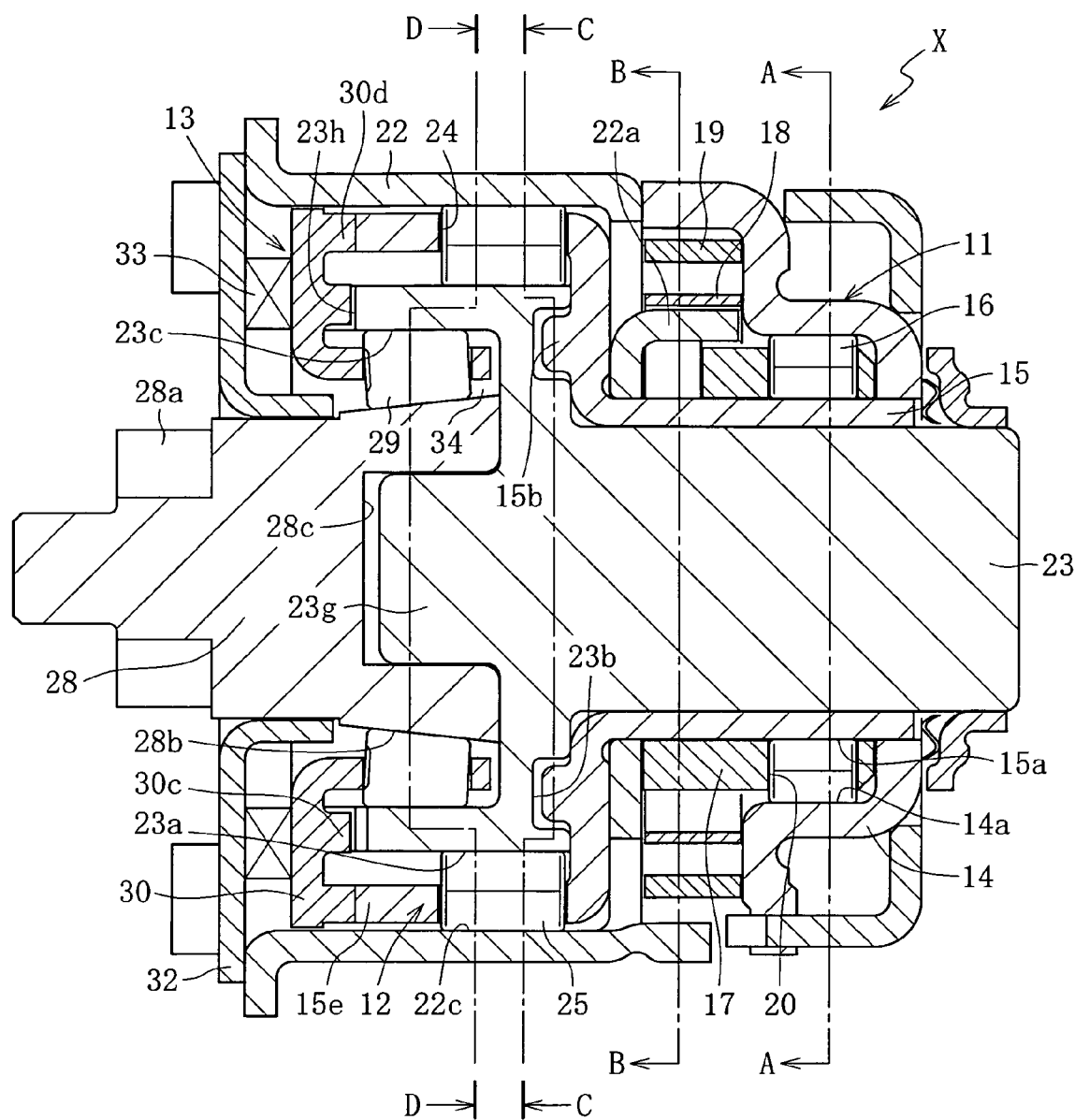
FIG. 1 is a sectional view of the overall construction of a clutch unit according to an embodiment of the present invention.

FIG. 1 shows the overall construction of a clutch unit X to be incorporated into a seat according to an embodiment of the present invention. The clutch unit X includes a lever side clutch section 11, a brake side clutch section 12 with a reverse input shutting off function provided on the output side, and a rotation control clutch section 13 disposed adjacent to the brake side clutch section 12.

Figure 2:
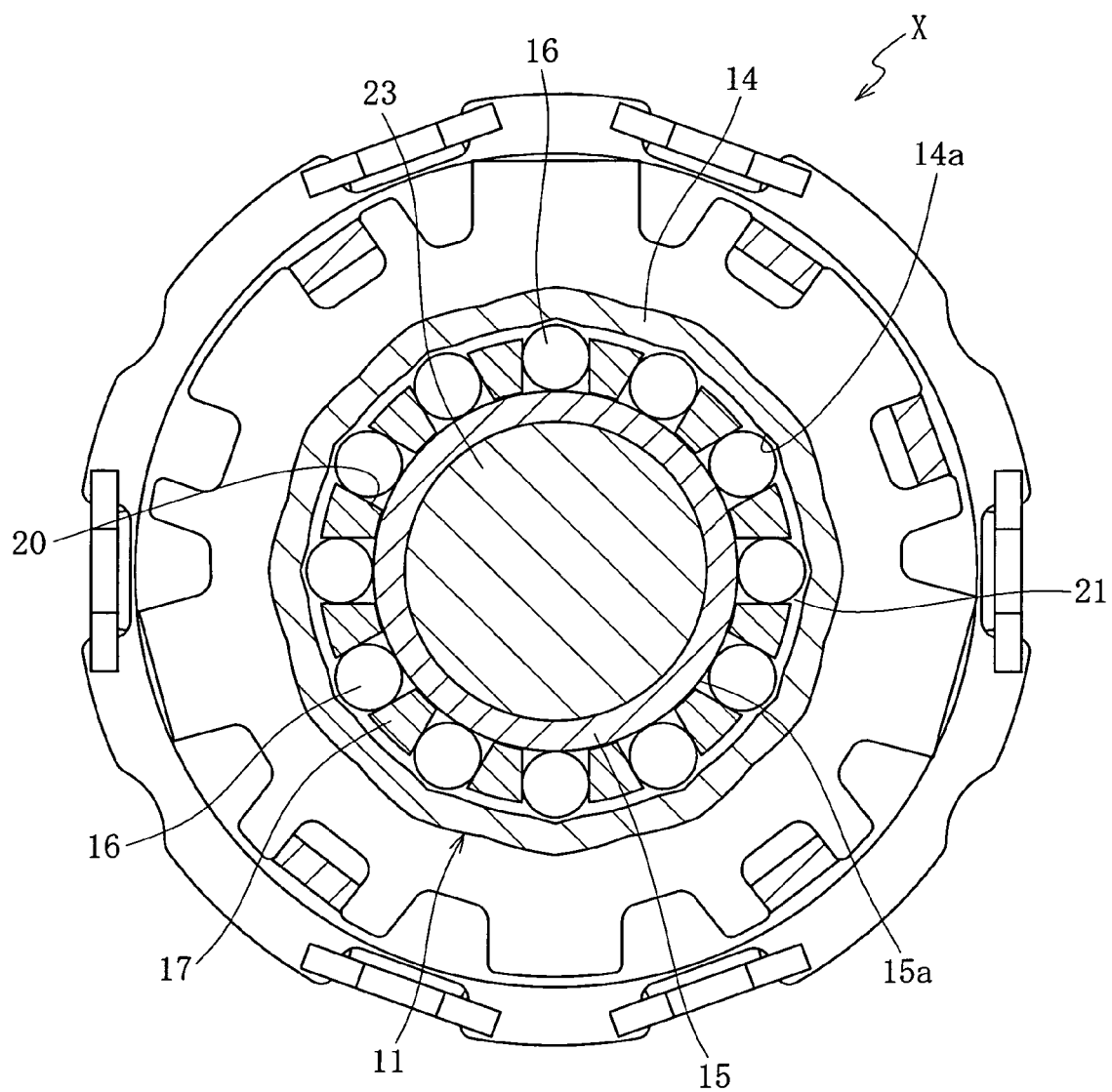
FIG. 2 is a sectional view taken along the line A-A of FIG. 1.
Figure 3:
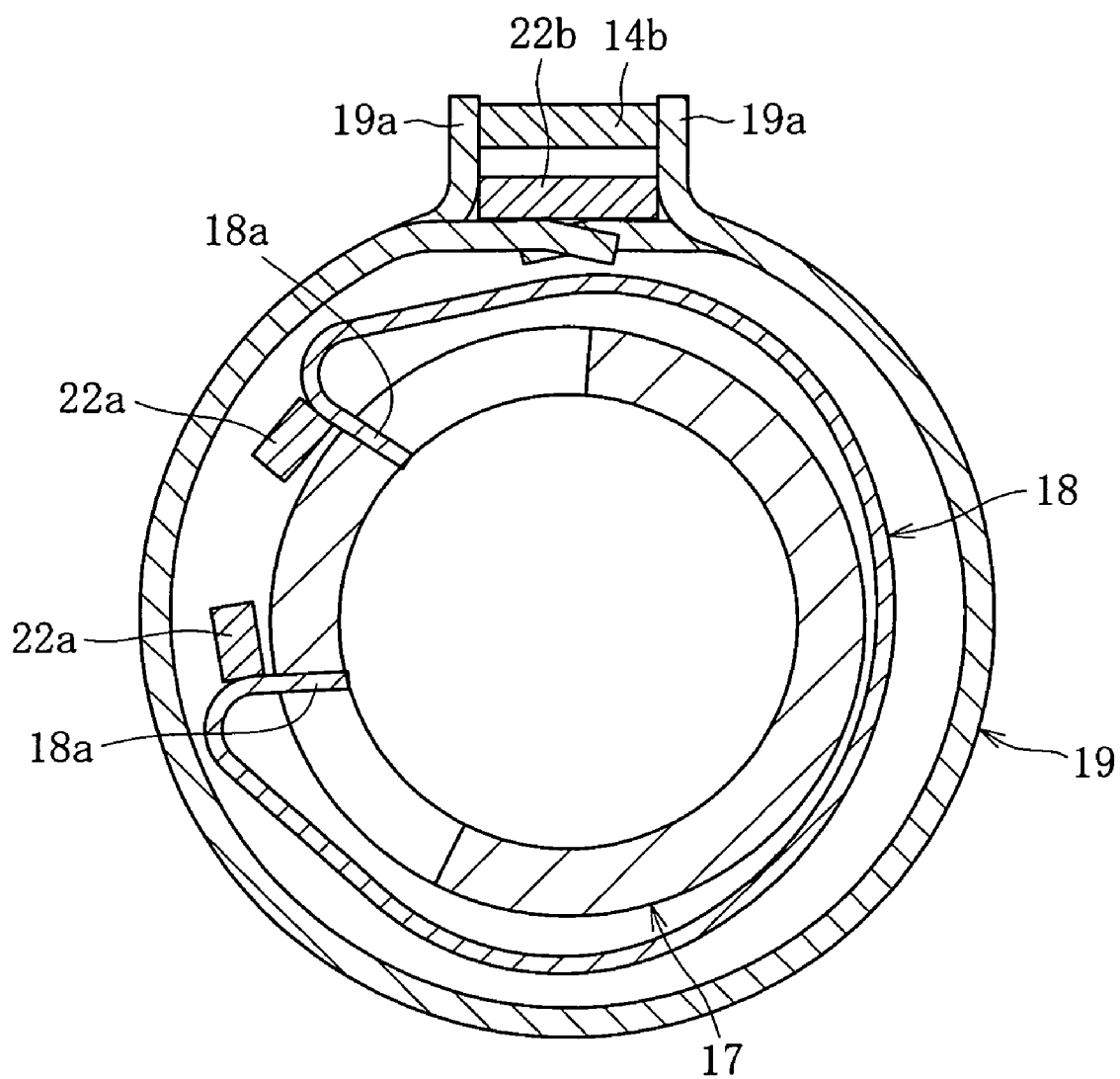
FIG. 3 is a sectional view taken along the line B-B of FIG. 1, showing two centering springs, a retainer, and a part of an outer ring.

As shown in FIGS. 1, 2, and 3, the lever side clutch section 11 has an outer ring 14 serving as an input side member, an inner ring 15 serving as an output side member, a plurality of cylindrical rollers 16 serving as engagement members, a retainer 17 retaining the cylindrical rollers 16, a centering spring 18 that is a first elastic member for restoring the retainer 17 to a neutral state, and a centering spring 19 that is a second elastic member for restoring the outer ring 14 to the neutral state.

In the inner periphery of the outer ring 14, a plurality of cam surfaces 14a are formed at equal circumferential intervals. The inner ring 15 has on the outer side thereof an outer peripheral surface 15a forming a wedge gap 21 between itself and the cam surfaces 14a of the outer ring 14. The retainer 17 has a plurality of pockets 20 accommodating the cylindrical rollers 16.

As shown in FIG. 3, the centering springs 18 and 19 are both ring-shaped plate springs with ends formed by rounding strip plate members, and one centering spring 18 is arranged on the inner side of the other centering spring 19. The centering spring 18 situated on the inner side has a pair of lock portions 18a formed by being bent radially inwards, and the centering spring 19 situated on the outer side has a pair of lock portions 19a formed by being bent radially outwards.

Figure 4:
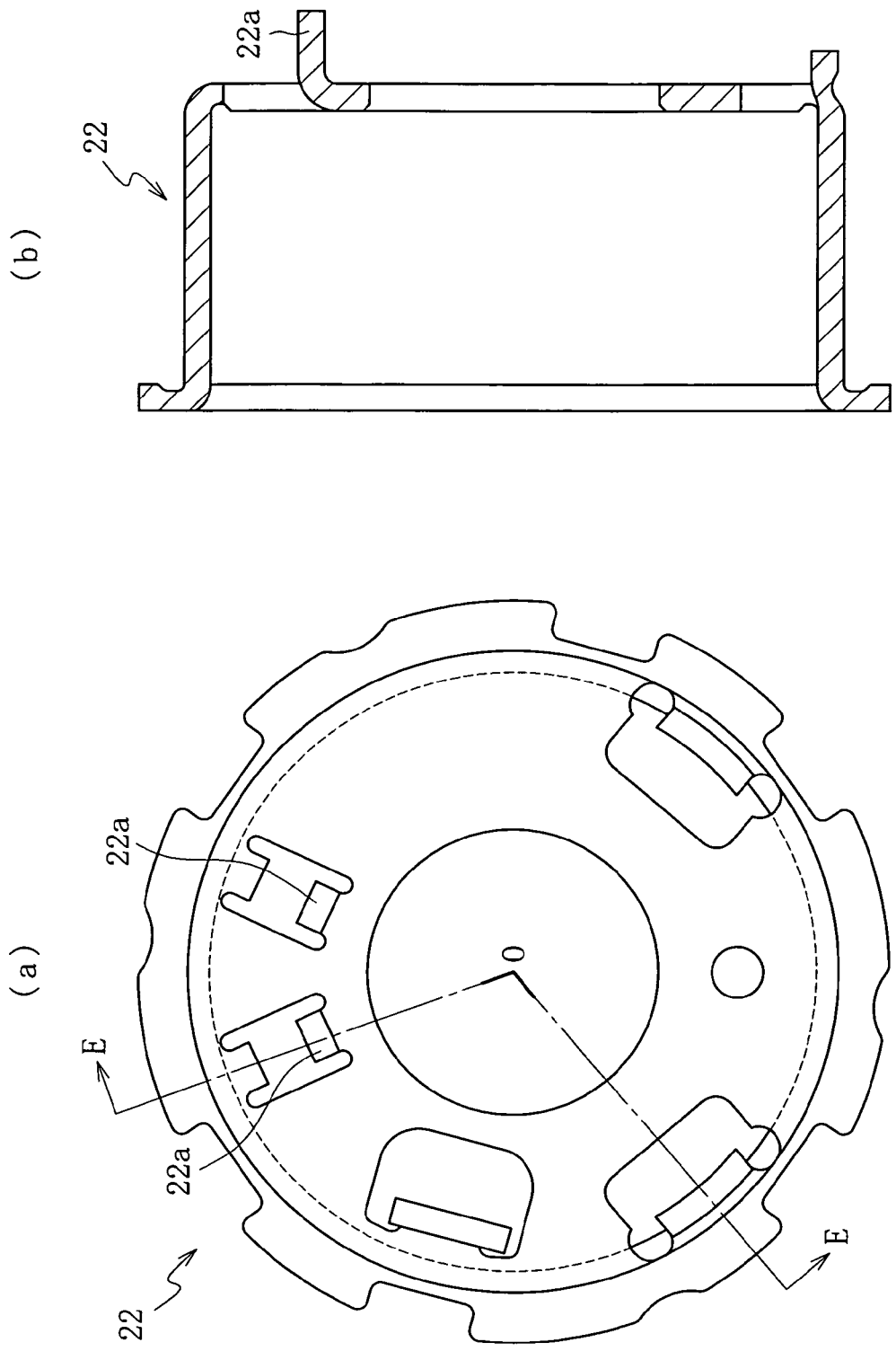
FIG. 4(a) is a right-hand side view of the outer ring of FIG. 1.
FIG. 4(b) is a sectional view taken along the line E-O-E of FIG. 4(a).

The centering spring 18 is arranged between the retainer 17 and an outer ring 22 which is a stationary side member of the brake side clutch section 12, one lock portion 18a is locked to the retainer 17, and the other lock portion 18a is locked to a claw portion 22a provided on the outer ring 22 (see FIGS. 4(a) and 4(b)).

In the centering spring 18, when input torque from the outer ring 14 is exerted, one lock portion 18a is engaged with a part of the retainer 17, and the other lock portion 18a is engaged with the claw portion 22a of the outer ring 22, so that, as the outer ring 14 rotates, the centering spring 18 is pushed open to accumulate elastic force, and when the input torque from the outer ring 14 is released, the retainer 17 is restored to the neutral state by the elastic restoring force thereof.

The centering spring 19 is arranged between the outer ring 14 and the outer ring 22 of the brake side clutch section 12, and both lock portions 19a are locked to a claw portion 14b provided on the outer ring 14, and locked to a claw portion 22b provided on the outer ring 22. The lock portions 19a are arranged circumferentially out of phase with respect to the lock portions 18a of the centering spring 18.

In the centering spring 19, when input torque from the outer ring 14 is exerted to rotate the outer ring 14, one lock portion 19a is engaged with the claw portion 14b of the outer ring 14, and the other lock portion 19a is engaged with the claw portion 22b of the outer ring 22, so that, as the outer ring 14 rotates, the centering spring 19 is pushed open to accumulate elastic force, and when the input torque from the outer ring 14 is released, the outer ring 14 is restored to the neutral state by the elastic restoring force thereof.

Figure 5:
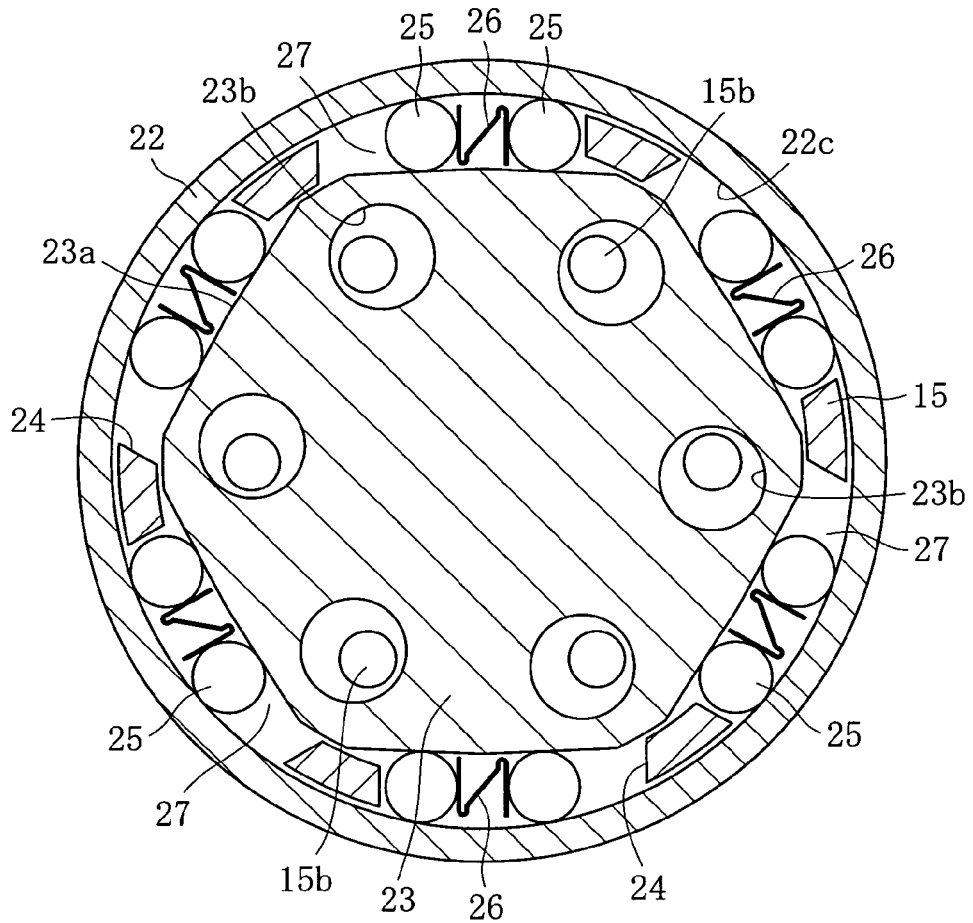
FIG. 5 is a sectional view taken along the line C-C of FIG. 1.
Figure 6:
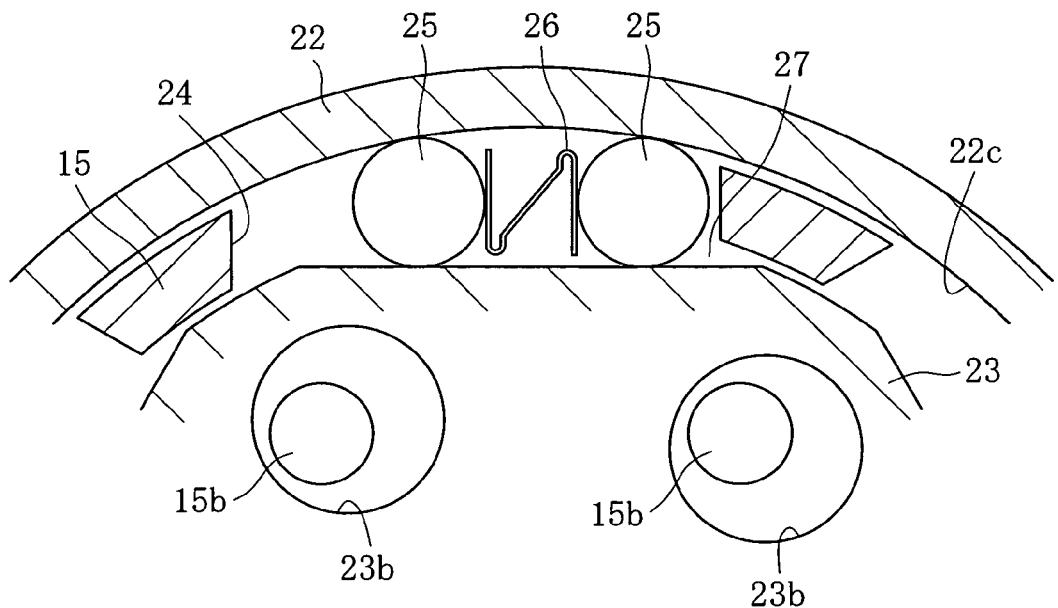
FIG. 6 is a main portion enlarged sectional view of FIG. 5.

As shown in FIGS. 1, 5, and 6, the so-called lock type brake side clutch section 12 having a reverse input shutting off function, is mainly formed of an inner peripheral surface 22c of the outer ring 22, a plurality of cam surfaces 23a provided on the outer side of an output shaft 23 at equal circumferential intervals (e.g., six surfaces in the case of the embodiment shown), a pair of cylindrical rollers 25 serving as engagement members provided between the inner peripheral surface 22c of the outer ring 22 and the cam surfaces 23a of the output shaft 23, elastic members each existing between the pair of cylindrical rollers 25, e.g., plate springs 26 of an N-shaped sectional configuration, and an inner ring 15 of the lever side clutch section 11 on which pockets 24 each accommodating cylindrical rollers 25 and a plate spring 26 are formed at equal circumferential intervals and which functions as a retainer.

A plurality of pin holes 23b are formed in the output shaft 23 at predetermined circumferential intervals, and pins 15b of the inner ring 15 are inserted into the pin holes 23b. The inner axial end of the output shaft 23 is coaxially coupled, through concavoconvex fit-engagement, with a pinion shaft 28 on which a pinion gear 28a is integrally formed, with the output shaft 23 and the pinion shaft 28 constituting an output side member.

The wedge gap 27 is formed between the inner peripheral surface 22c of the outer ring 22 and the cam surfaces 23a of the output shaft 23. Formed on the outer ring 22 are the lock portions 22a, 22b (see FIG. 3) to be engaged with the centering springs 18, 19 of the lever side clutch section 11.

Figure 7:
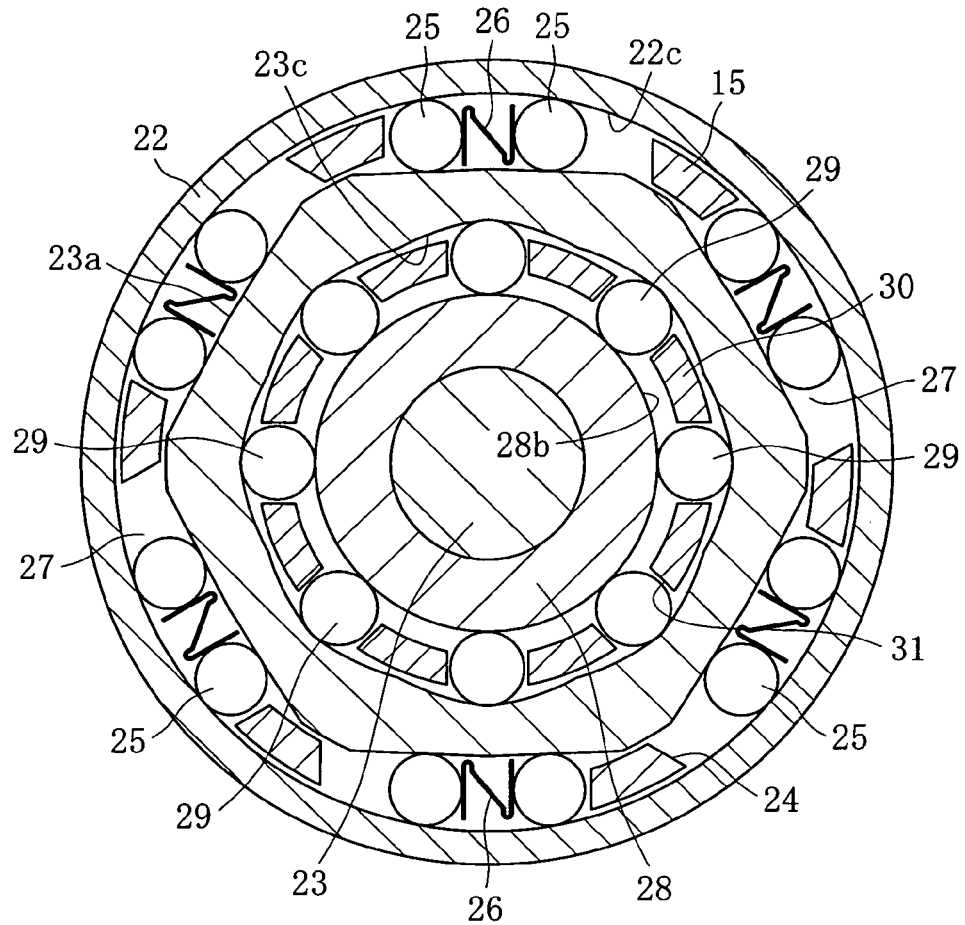
FIG. 7 is a sectional view taken along the line D-D of FIG. 1.
Figure 8:
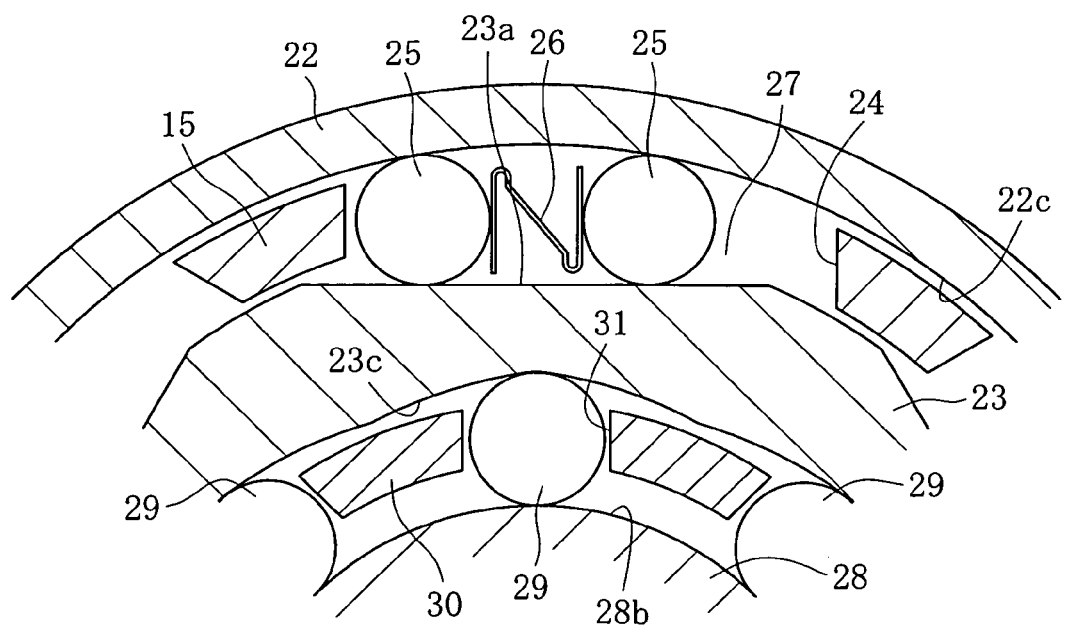
FIG. 8 is a main portion enlarged sectional view of FIG. 7.

As shown in FIGS. 1, 7, and 8, the rotation control clutch section 13 disposed adjacent to the brake side clutch section 12 is mainly formed of a plurality of cam surfaces 23c provided at equal circumferential intervals on the inner peripheral surface of the output shaft 23, a tapered surface 28b that is the outer peripheral surface of the pinion shaft 28, tapered rollers 29 provided between the cam surfaces 23c of the output shaft 23 and the tapered surface 28b of the pinion shaft 28, a retainer 30 serving as a control means for controlling the engagement/disengagement of the tapered rollers 29, and the inner ring 15.

Figure 9:
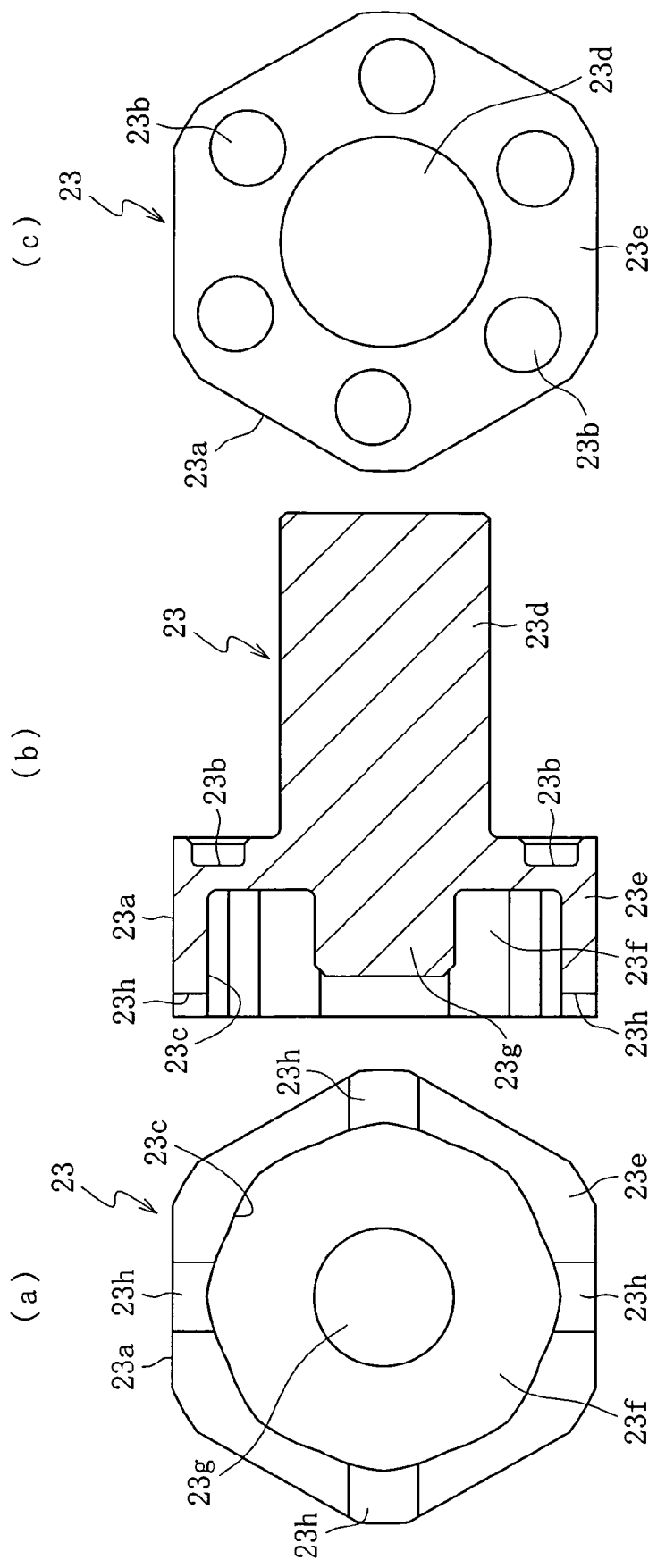
FIG. 9(a) is a left-hand side view of FIG. 9(b)
FIG. 9(b) is a sectional view of the output shaft of FIG. 1.
FIG. 9(c) is a right-hand side view of FIG. 9(b).

As shown in FIGS. 9(a) through 9(c), the output shaft 23 includes a small diameter portion 23d serving as the shaft portion and a large diameter portion 23e formed by enlarging the diameter of one end portion of the small diameter portion 23d. Provided in the large diameter portion 23e is a recess 23f where the tapered rollers 29, the pinion shaft 28, and a part of the retainer 30 are arranged, and, substantially at the center of the recess, there is provided a protrusion 23g, which is fit-engaged with a recess 28c of the pinion shaft 28. Further, at the end surface of the large diameter portion 23e, there are provided, at equal circumferential intervals (at four circumferential positions in the example shown), recesses 23h into which a part of the retainer 30 is fitted for phase matching with the retainer 30. Further, in the rear surface of the large diameter portion 23e, there are formed, at equal circumferential intervals, a plurality of (e.g., six in the embodiment shown) pin holes 23b into which the pins 15b of the inner ring 15 are inserted as described above.

Figure 10:
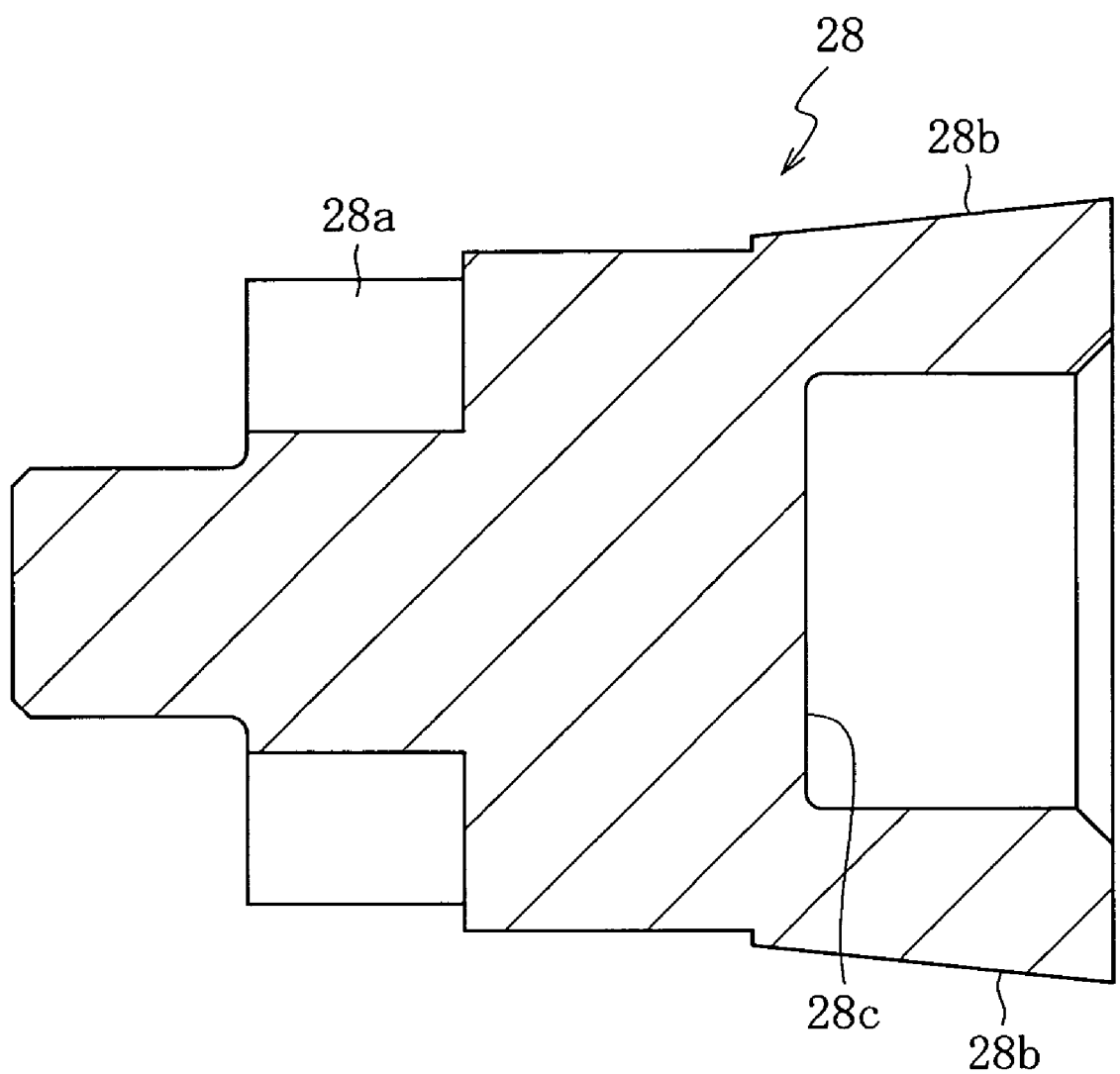
FIG. 10 is a sectional view of a pinion shaft of FIG. 1.

As shown in FIG. 10, the protrusion 23g of the output shaft 23 is fit-engaged with the recess 28c formed at the inner side shaft end surface to thereby effect center alignment on both and to couple them coaxially together. At the outer shaft end, the pinion gear 28a is integrally formed. A tapered surface 28b is formed on the outer peripheral surface of the pinion shaft 28, in particular, the output shaft side portion thereof. The tapered surface 28b is inclined along the axial direction by gradually increasing the diameter of the pinion shaft 28 toward the output shaft. As a result, there is formed, between the tapered surface and the cam surfaces 23c parallel to the axis of the output shaft 23, a wedge gap 34 reduced in diameter from the outer side toward the inner side with respect to the axial direction.

Figure 11:
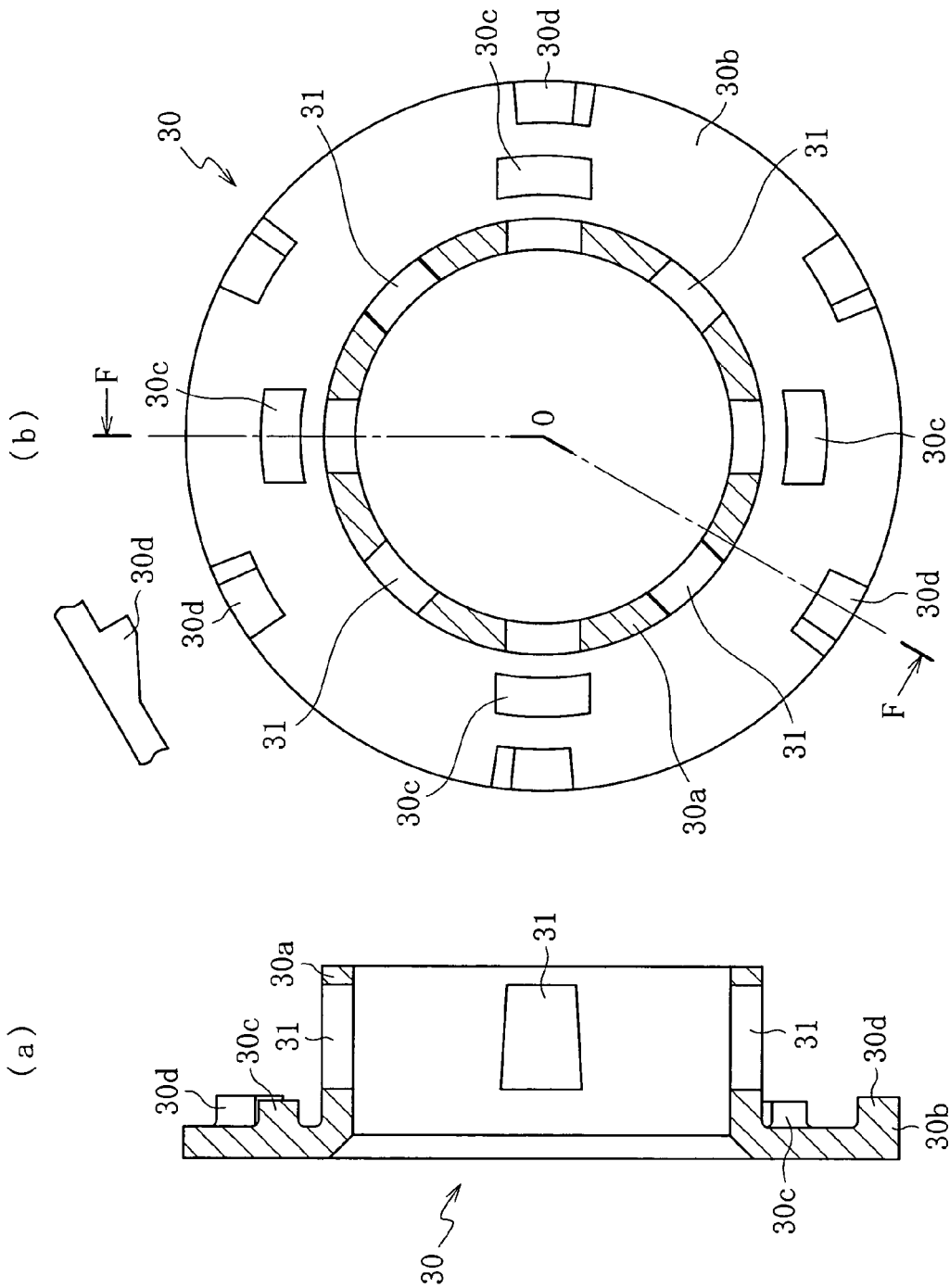

As shown in FIGS. 11(a) and 11(b), the retainer 30 includes a cylindrical portion 30a inserted and arranged between the cam surfaces 23c of the large diameter portion 23e of the output shaft 23 and the tapered surface 28b of the pinion shaft 28, and a flange portion 30b extending radially and integrally from one end of the cylindrical portion 30a. Provided in the cylindrical portion 30a are a plurality of pockets 31 accommodating the plurality of (eight, in the embodiment shown) tapered rollers 29 and supporting them at equal circumferential intervals. The pockets 31 have substantially the same tapered configuration as the tapered rollers 29. The taper angle of the tapered rollers 29 preferably ranges 4 to 8 degrees, and is more preferably, approximately 6 degrees. The flange portion 30b has, around and in the vicinity of the outer side of the cylindrical portion 30a, a plurality of (four, in the embodiment shown) protrusions 30c to be fit-engaged with the recesses 23h of the output shaft 23 for phase matching with the output shaft 23. Further, at the outer peripheral edge portion of the flange portion 30b, there are formed, at equal circumferential intervals, a plurality of (six, in the embodiment shown) torque cam portions 30d continuously increased in height in the circumferential direction.

Figure 12:
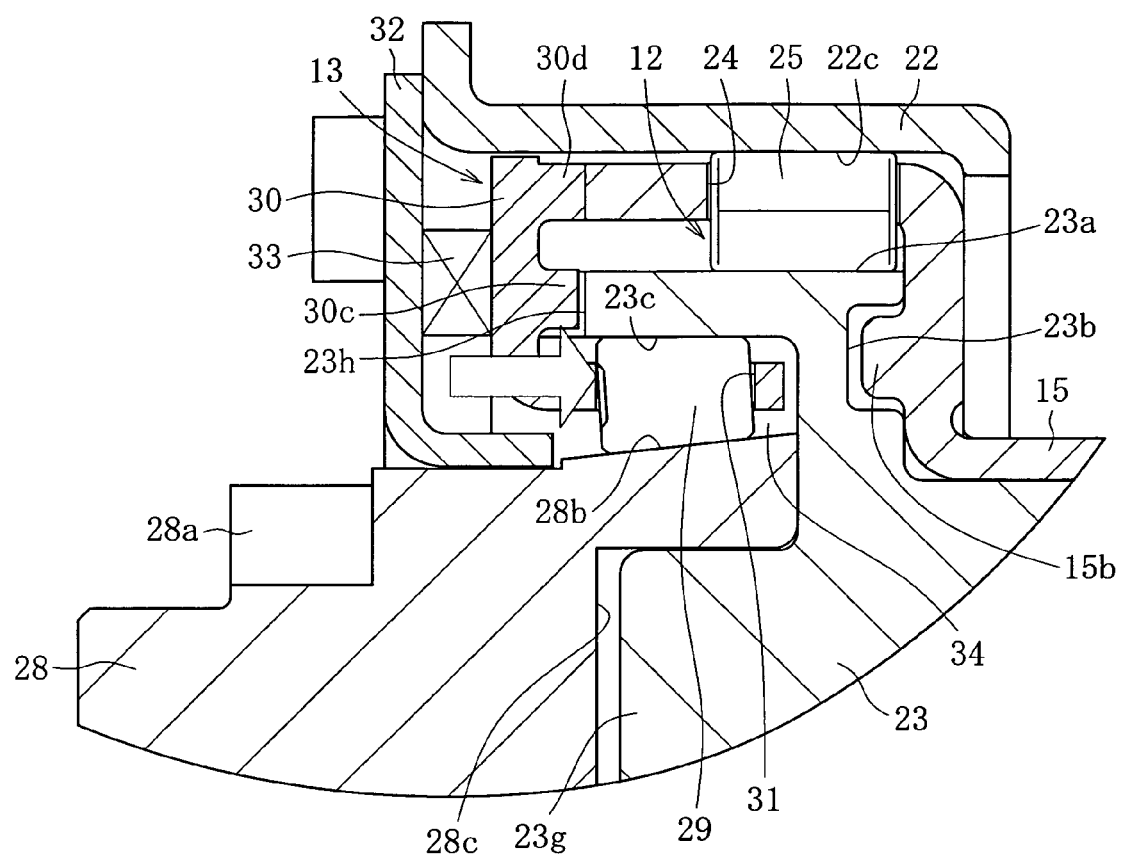
FIG. 12 is a main portion enlarged sectional view of a rotation control clutch section of FIG. 1.

As shown in FIG. 12, the retainer 30 is arranged so as to be axially movable through the intermediation of a wave washer 33 provided between itself and a side plate 32 fixed to the casing. Due to the wave washer 33, the retainer 30 is constantly pressed toward the output shaft side, and the tapered rollers 29 are forced toward the narrower side of the wedge gap 34, with the output shaft 23 and the pinion shaft 28 being engaged with each other through the intermediation of the tapered rollers 29. It is desirable for the retainer 30 to receive an axial load from the inner ring 15, and, as countermeasures against wear, to be formed of heat-treated iron-type material, and to be manufactured for example, through press molding of case hardening steel (SCr415 or SCr420, SCM415 or SCM420) that has undergone carburizing and quenching/tempering.

Figure 13:
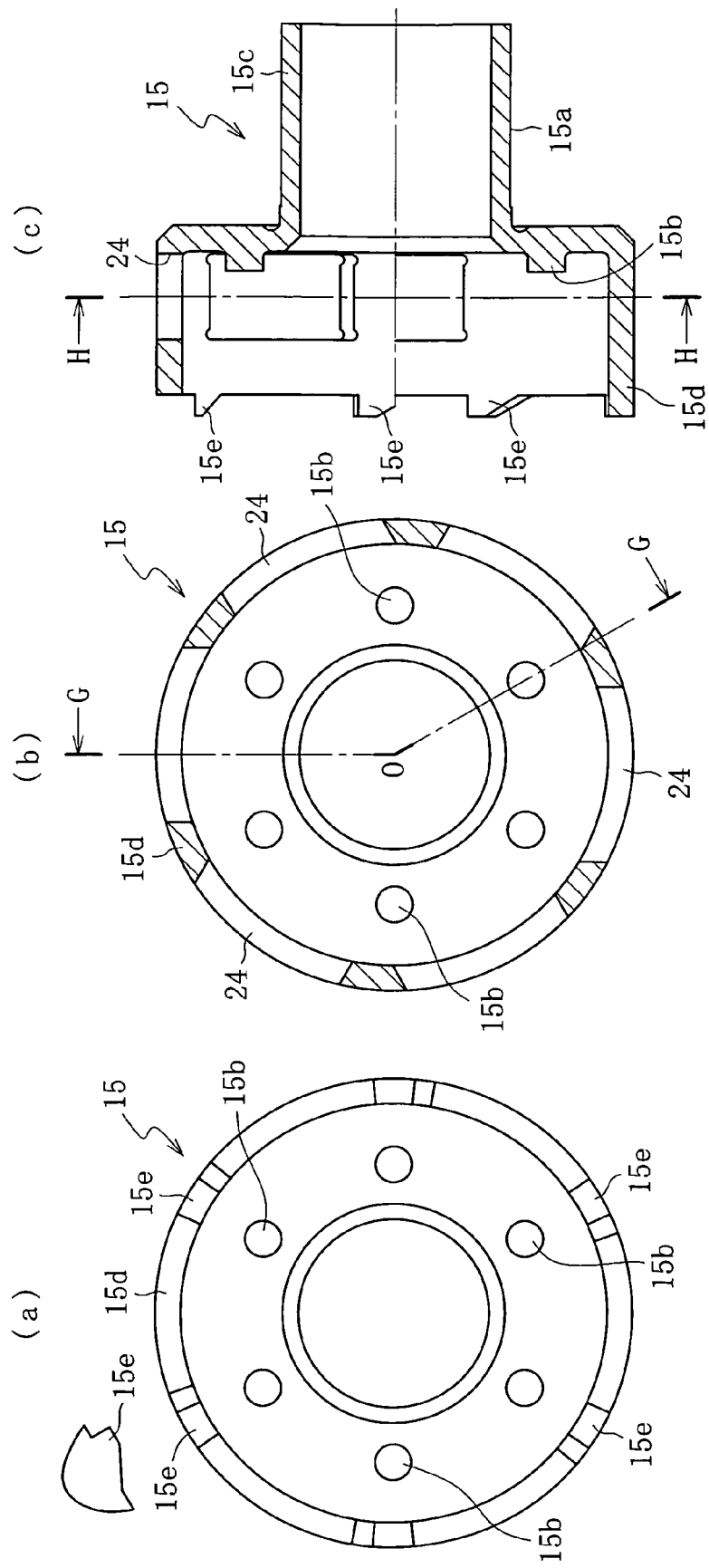

As shown in FIGS. 13(a) through 13(c), the inner ring 15 includes a cylindrical portion 15c fitted onto the output shaft 23, and a large diameter portion 15d formed by increasing the diameter of one end portion of the cylindrical portion 15c. Formed at the end surface of the large diameter portion 15d are torque cam portions 15e in phase with the torque cam portions 30d provided on the flange portion 30b of the retainer 30 described above. A plurality of pockets 24 accommodating cylindrical rollers 25 are formed in the large diameter portion 15d at equal circumferential intervals. Formed on the rear surface of the large diameter portion 15d, at equal circumferential intervals, are a plurality of (e.g., six, in the embodiment shown) pins 15b to be inserted into the pin holes 23b of the output shaft 23.

In the lever side clutch section 11, when input torque acts on the outer ring 14, the cylindrical rollers 16 are engaged with the wedge gap 21, and the torque is transmitted to the inner ring 15 via the cylindrical rollers 16 to thereby rotate the inner ring 15. At this time, as the outer ring 14 and the retainer 17 rotate, elastic force is accumulated in the centering springs 18 and 19. When the input torque ceases to exist, the outer ring 14 and the retainer 17 are restored to the neutral state by the elastic force of the centering springs 18 and 19, whereas the inner ring 15 maintains the given rotating position. Thus, through repeated rotation of the outer ring 14, that is, pumping operation, rotation amount is increasingly accumulated in the inner ring 15.

In the brake side clutch section 12, when reverse input torque is input to the output shaft 23, the cylindrical rollers 25 are engaged with the wedge gap 27, and the output shaft 23 is locked with respect to the outer ring 22. Thus, the reverse input torque from the output shaft 23 is locked by the brake side clutch section 12, and reflux of the reverse input torque to the lever side clutch section 11 is shut off.

On the other hand, input torque from the outer ring 14 is input to the inner ring 15 via the lever side clutch section 11, and the inner ring 15 is engaged with the cylindrical rollers 25 to press against the elastic force of the plate spring 26, whereby the cylindrical rollers 25 are detached from the wedge gap 27 and the locked state of the output shaft 23 is canceled, making the output shaft 23 rotatable. When the inner ring 15 further rotates, the pins 15b of the inner ring 15 are engaged with the pin holes 23b of the output shaft 23, whereby the input torque from the inner ring 15 is transmitted to the output shaft 23 via the pins 15b and the pin holes 23b, and hence the output shaft 23 rotates.

Figure 14:
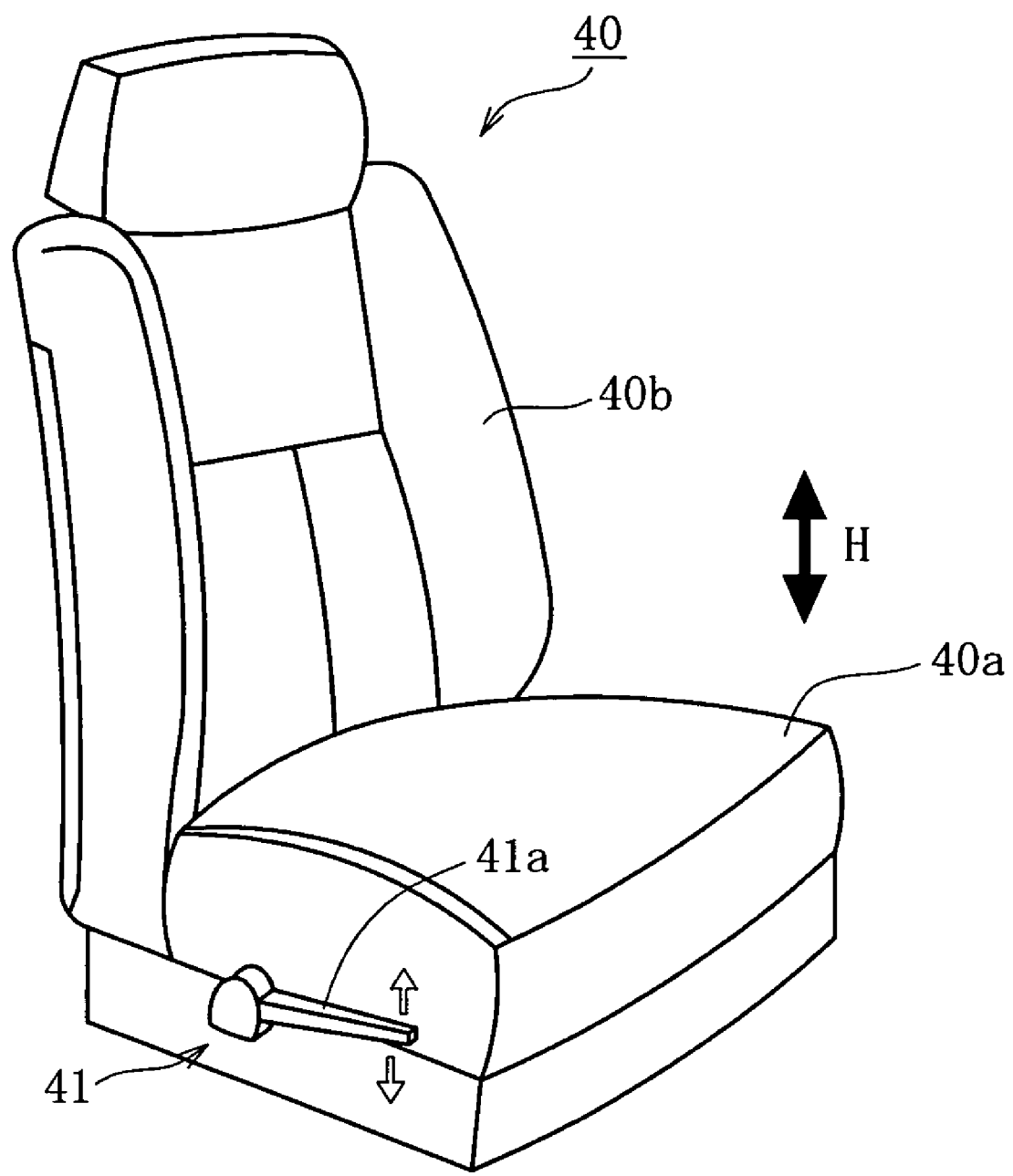
FIG. 14 is a conceptual drawing showing an automotive seat.

The clutch unit X having the construction as described in detail above is incorporated, for example, a seat adjustment device 40 to be used. FIG. 14 shows a seat 40 provided in the passenger compartment of an automobile. The seat 40 includes a seating seat 40a and a backrest seat 40b, and has a seat adjustment device 41 for adjusting the height H of the seating seat 40a. The adjustment of the height H of the seating seat 40a is effected by a lever 41a of the seat adjustment device 41.

FIG. 15(a) is a conceptual drawing showing a construction example of the seat adjustment device 41. One end of each of link members 41c and 41d are pivoted to a slide movable member 41b₁ of a seat slide adjuster 41b, which is a movement mechanism. The other ends of the link members 41c and 41*d* are pivoted to the seating seat 40*a*. The other end of the link member 41*c* is pivoted to a sector gear 41*f* via a link member 41*e*. The sector gear 41*f* is pivoted to the seating seat 40*a*, and is swingable around a fulcrum 41*f*₁. The other end of the link member 41*d* is pivoted to the seating seat 40*a*.

The clutch unit X of the above-described embodiment is fixed to an appropriate portion of the seating seat 40*a*; a lever 41*a* formed, for example, of resin, is connected to the outer ring 14 of the lever side clutch section 11, and the pinion gear 28*a* provided on the pinion shaft 28 of the brake side clutch portion 12 is in mesh with the sector gear 41*f*, which is a rotary member.

Figure 15:
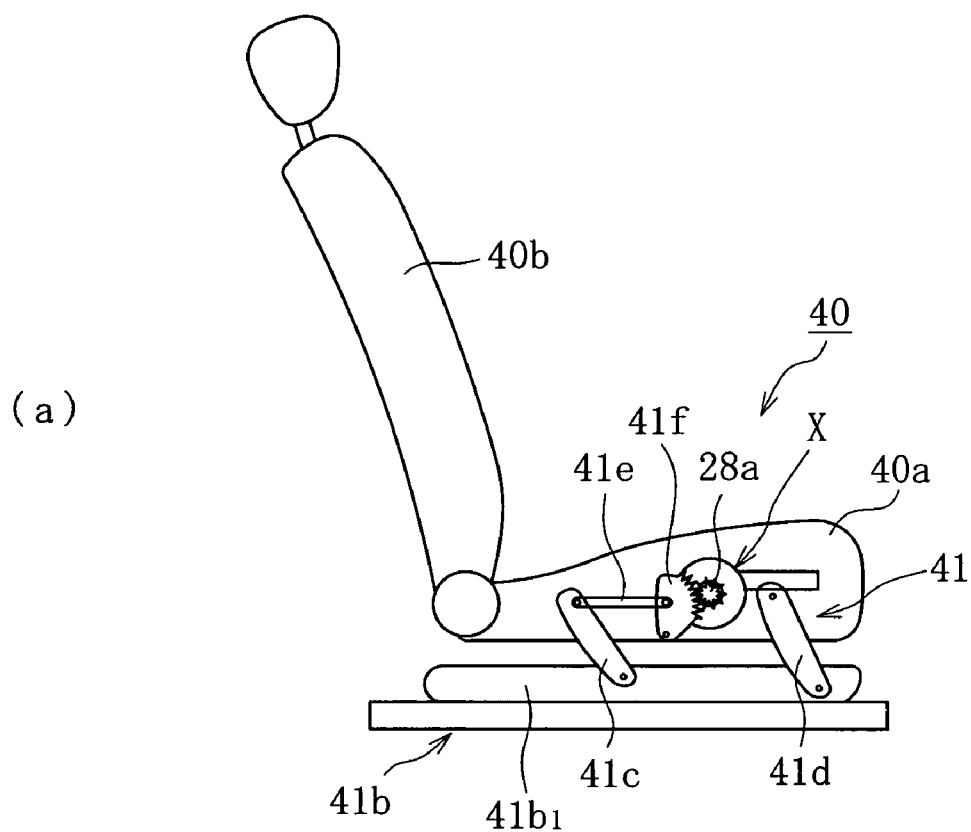
FIG. 15(a) is a conceptual drawing showing a construction example of a seat adjustment device.
FIG. 15(b) is a main portion enlarged view of the same.
Figure 15:
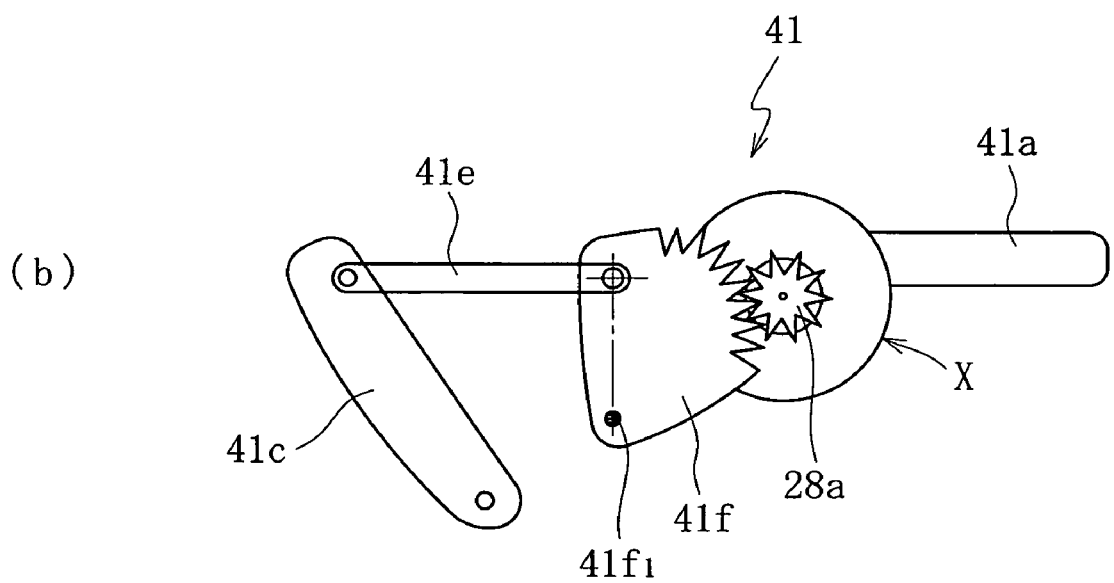

For example, when, in FIG. 15(*b*), pumping operation is performed on the lever 41*a* counterclockwise (upwardly), the input torque in that direction is transmitted to the pinion gear 28*a* via the clutch unit X, and the pinion gear 28*a* rotates counterclockwise by inching. And, the sector gear 41*f* in mesh with the pinion gear 28*a* swings clockwise, and pulls the other end of the link member 41*c* via the link member 41*e*. As a result, both the link member 41*c* and the link member 41*d* are erected, and the seat surface of the seating seat 40*a* is heightened.

When, after the height H of the seating seat 40*a* has been adjusted, the lever 41*a* is released, the lever 41*a* is rotated clockwise by the elastic force of the centering springs 18 and 19, and is restored to the former position (neutral state). When a single operation is performed on the lever 41*a* clockwise (downwardly), the height of the seating seat 40*a* is reduced through the operation reverse to that described above. When the lever 41*a* is released after the height adjustment, the lever 41*a* rotates counterclockwise, and is restored to the former position (neutral state).

Figure 16:
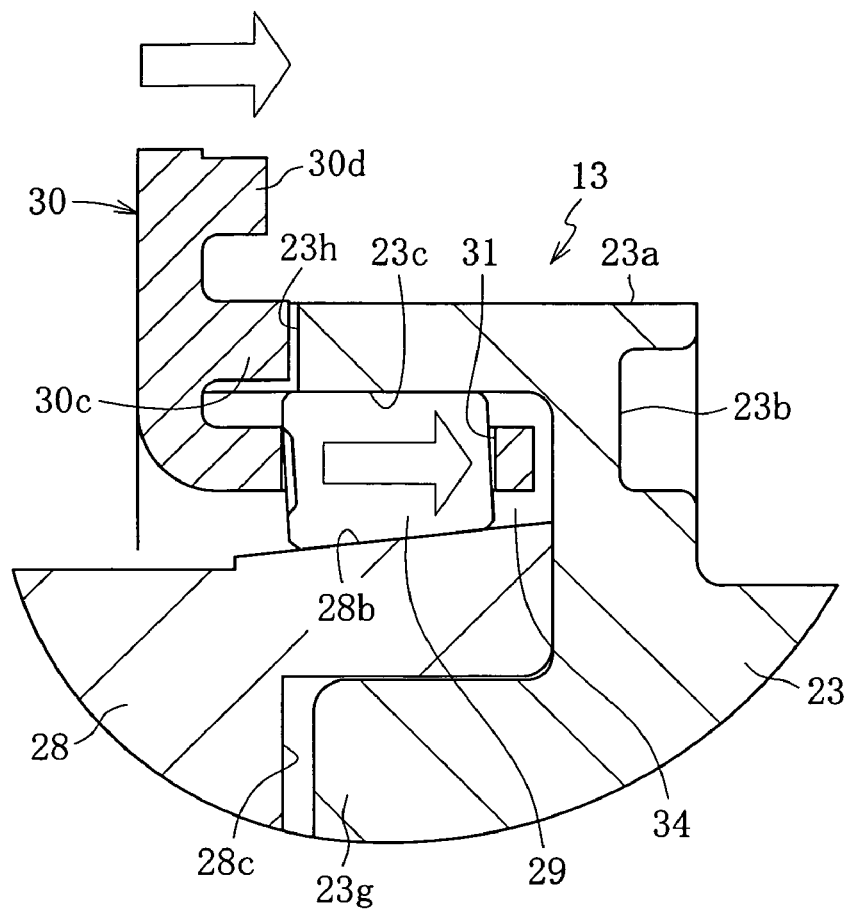
FIG. 16 is a main portion enlarged sectional view showing the tapered rollers as engaged between the output shaft and the pinion shaft in the rotation control clutch section.
Figure 17:
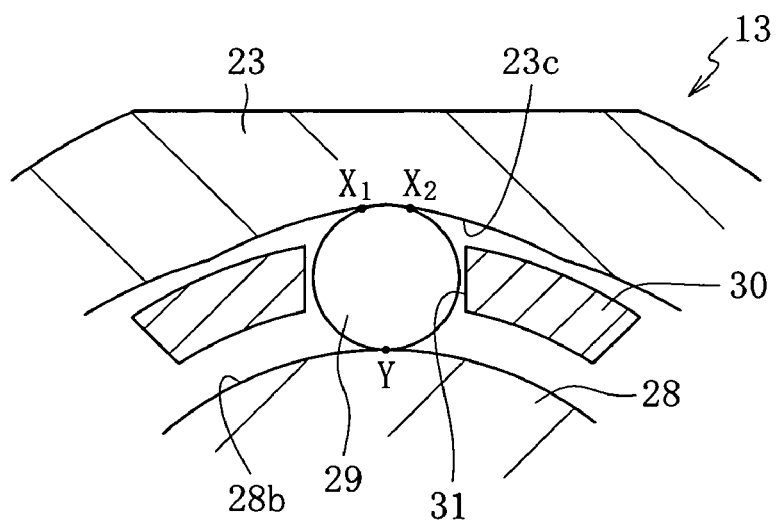
FIG. 17 is a main portion enlarged sectional view showing the tapered rollers as engaged between the output shaft and the pinion shaft in the rotation control clutch section.

As shown in FIG. 16, in the rotation control clutch section 13 of the clutch unit X, when the tapered rollers 29 are pushed toward the narrower side of the wedge gap 34 (in the direction of the open arrow in the drawing) by the retainer 30, the output shaft 23 and the pinion shaft 28 are engaged with each other by the tapered rollers 29 and are integrated to be placed in a locked state. That is, as shown in FIG. 17, each tapered roller 29 is engaged at three points: two points $X_1$ and $X_2$ on the cam surface 23*c* of the output shaft 23 and one point Y on the tapered surface 28*b* of the pinion shaft 28, and the pinion shaft 28 can rotate integrally with the output shaft 23 both clockwise and counterclockwise. When the tapered rollers 29 are thus in the engaged state, it is possible to rotate the output shaft 23 and the pinion shaft 28 by inching through pumping operation using the lever 41*a*.

Figure 18:
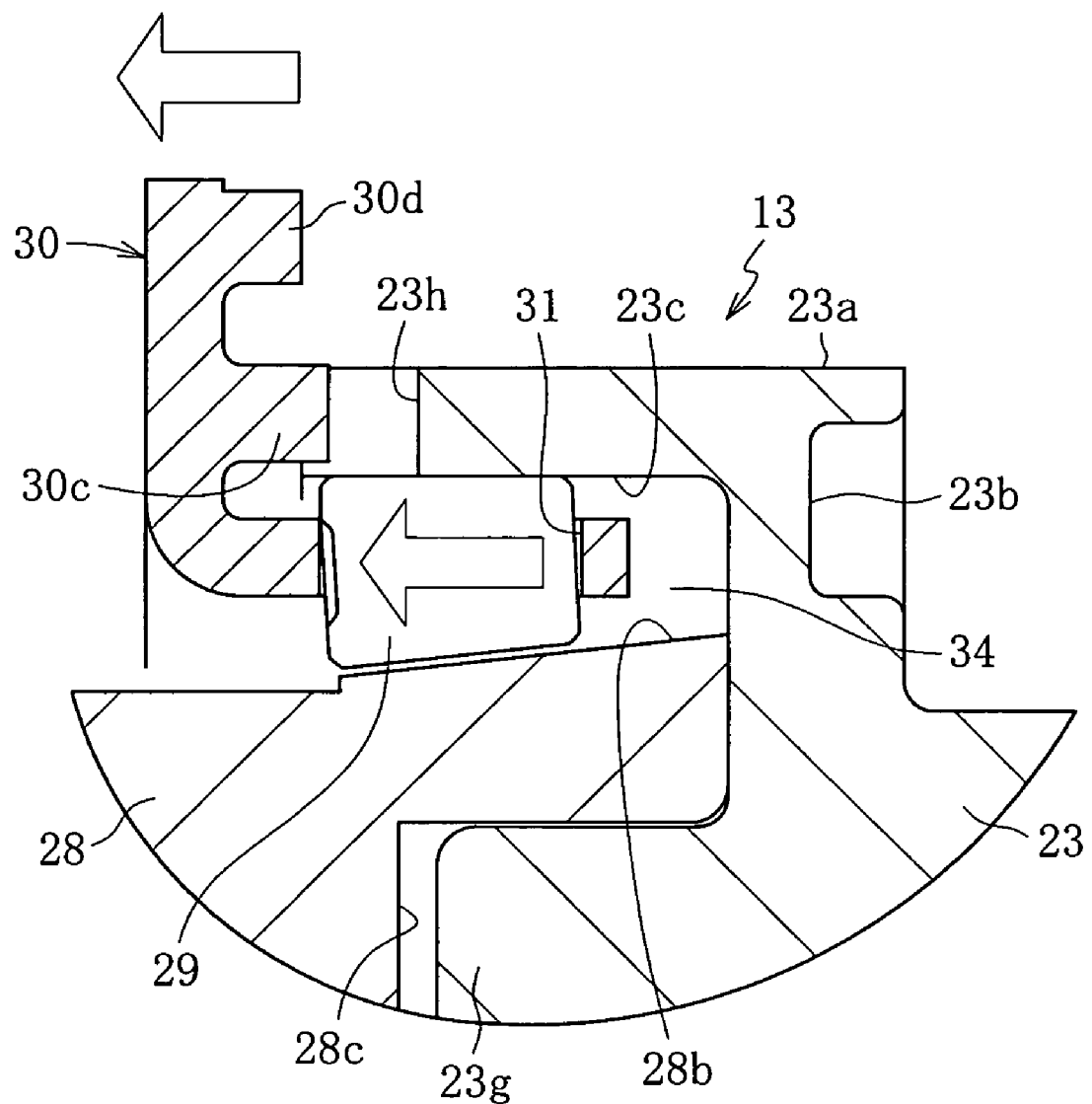
FIG. 18 is a main portion enlarged sectional view showing the tapered rollers as detached from between the output shaft and the pinion shaft in the rotation control clutch section.

On the other hand, as shown in FIG. 18, when the retainer 30 is moved in the direction of the open arrow, the tapered rollers 29 accommodated in the pockets 31 thereof also move in the same direction, that is, toward the wider side of the wedge gap 34, so that a gap is generated between each tapered roller 29 and the pinion shaft 28. As a result, the pinion shaft 28 is disengaged from the output shaft 23 and becomes rotatable, that is, it can rotate singly. When, in this state, a load is being applied to the pinion shaft 28, the pinion shaft 28 makes a one-stroke rotation.

By controlling the engagement of the tapered rollers 29 (by locking or releasing them), it is possible to cause the pinion shaft 28 to rotate by inching or to make a one-stroke rotation. The control of the engagement of the tapered rollers 29 is effected by the retainer 30 and the inner ring 15. The control by the retainer 30 and the inner ring 15 is described in detail below.

Figure 19:
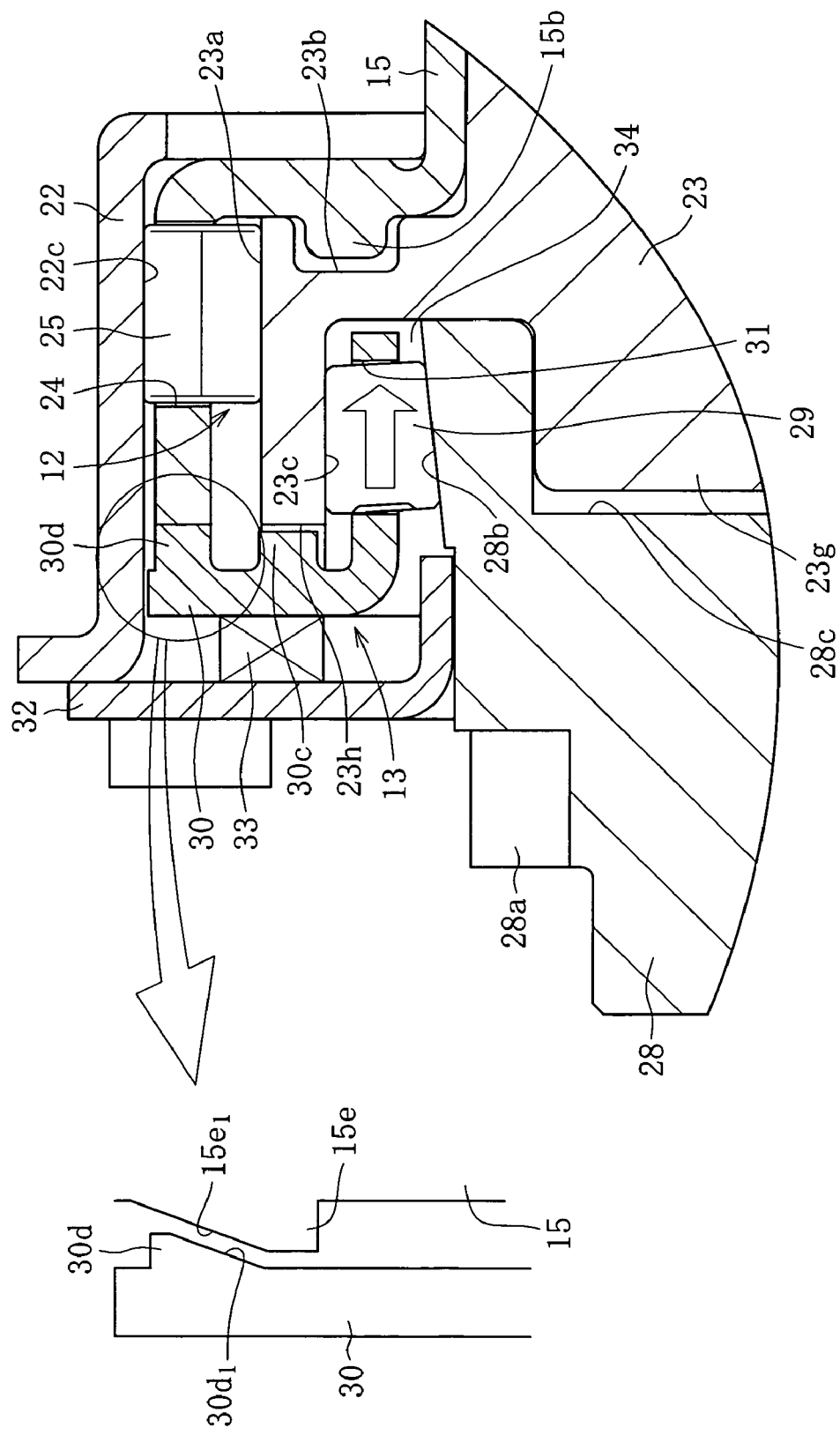
FIG. 19 is an explanatory view showing the torque cam portion of the retainer and the torque cam portion of the inner ring in the lever non-operating state.

First, as shown in FIG. 19, in the state in which the lever 41*a* is not operated, a torque cam portion 30*d* formed on the flange portion 30*b* of the retainer 30 and a torque cam portion 15*e* formed on the large diameter portion 15*d* of the inner ring 15 are in the positional relationship as shown in the drawing. That is, a cam surface $30d_1$ of the torque cam portion 30*d* of the retainer 30 and a cam surface $15e_1$ of the torque cam portion 15*e* of the inner ring 15 are in the positional relationship axially opposed to each other. As shown in FIGS. 16 and 17, at this time, with the retainer 30 being pressed in the direction of the arrow in the drawing by the wave washer 33, the tapered rollers 29 are engaged with the output shaft 23 and the pinion shaft 28.

Figure 20:
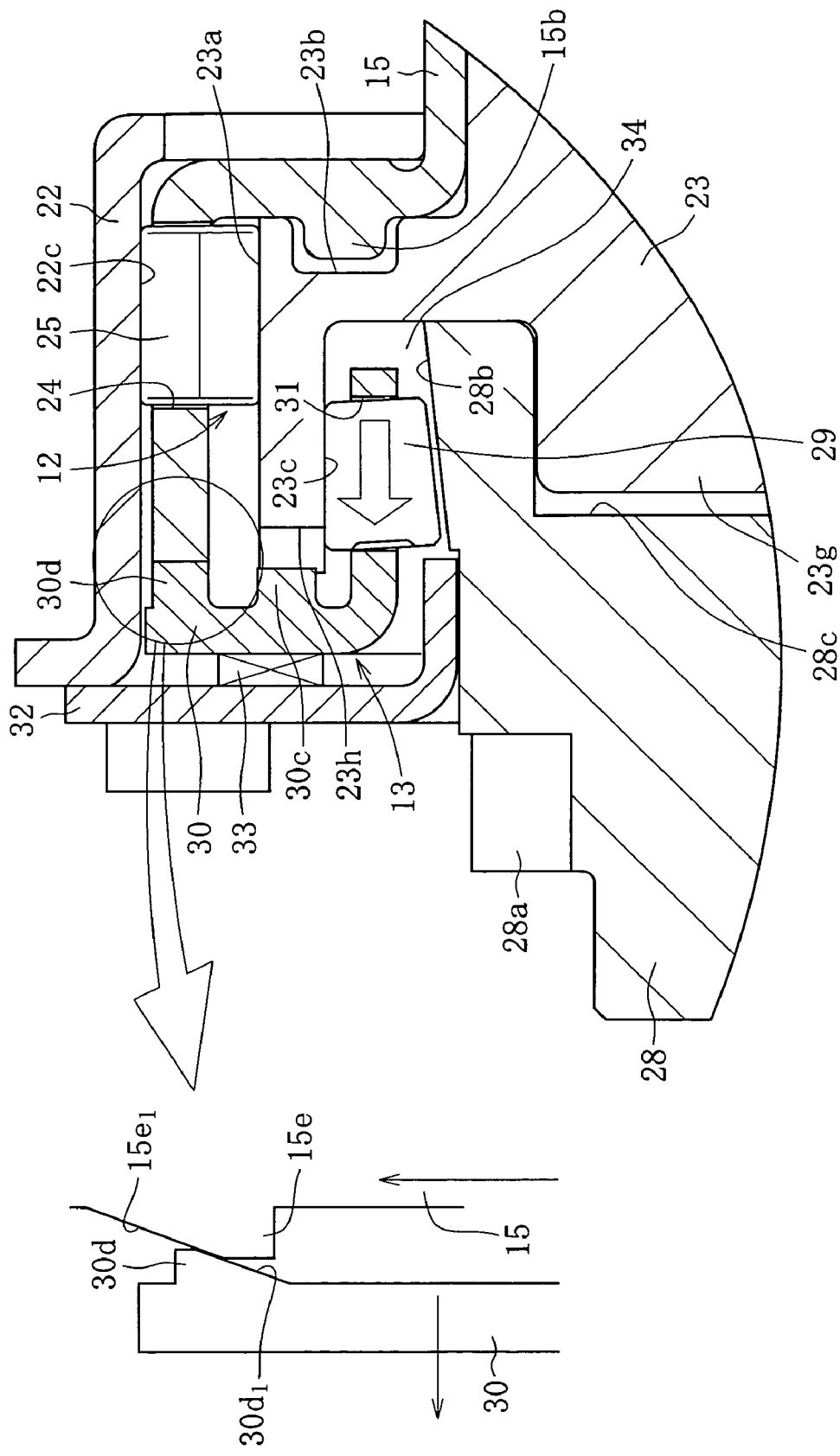
FIG. 20 is an explanatory view showing the torque cam portion of the retainer and the torque cam portion of the inner ring in the lever operating state.

Next, when the inner ring 15 is rotated via the lever side clutch section 11 through operation of the lever 41*a*, the protrusion 30*c* of the retainer 30 is fit-engaged with the recess 23*h* of the output shaft 23 for phase matching with the output shaft 23, so that the retainer 30 does not rotate. As a result, as shown in FIG. 20, the retainer 30 moves in the direction of the open arrow in the drawing against the elastic force of the wave washer 33, and the torque cam portion 30*d* of the retainer 30 and the torque cam portion 15*e* of the inner ring 15 are placed in the positional relationship as shown in the drawing. That is, the cam surface $30d_1$ of the torque cam portion 30*d* of the retainer 30 moves in the direction of the solid-line arrow relative to the cam surface $15e_1$ of the torque cam portion 15*e* of the inner ring 15. Due to the axial movement of the retainer 30 caused by the rotation of the inner ring 15, the tapered rollers 29 accommodated in the pockets 31 of the retainer 30 also move simultaneously to thereby cancel the engagement of the output shaft 23 and the pinion shaft 28. Through the canceling of this engagement, the pinion shaft 28 becomes rotatable, and, when, for example, torque in the rotating direction is applied to the pinion shaft 28, the pinion shaft 28 can be caused to make a one-stroke rotation in that direction.

By controlling (locking or releasing) the engagement of the tapered rollers 29 by the retainer 30 and the inner ring 15 as described above, it is possible to cause the pinion shaft 28 to rotate by inching or to make a one-stroke rotation through operation with the lever 41*a*. For example, in the case shown in FIGS. 21 through 23, by performing pumping operation on the lever 41*a* counterclockwise (upwardly), the output shaft 23 and the pinion shaft 28 are caused to rotate by inching, and, in the case shown in FIGS. 25 and 26, by performing a single operation on the lever 41*a* clockwise (downwardly), the output shaft 23 and the pinion shaft 28 are caused to make a one-stroke rotation. These operations are described in detail below.

Figure 21:
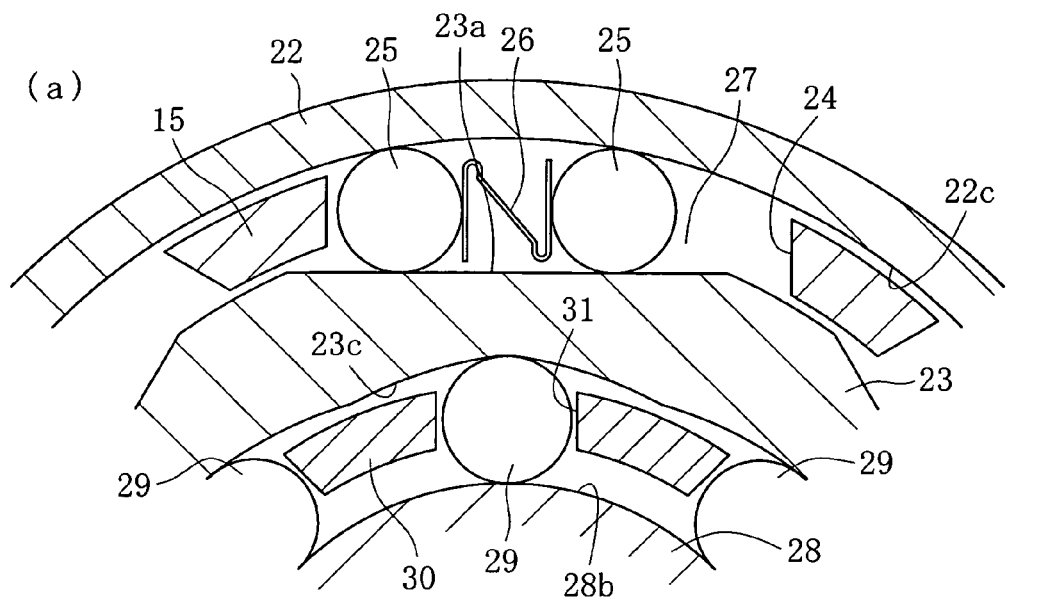
Figure 21:
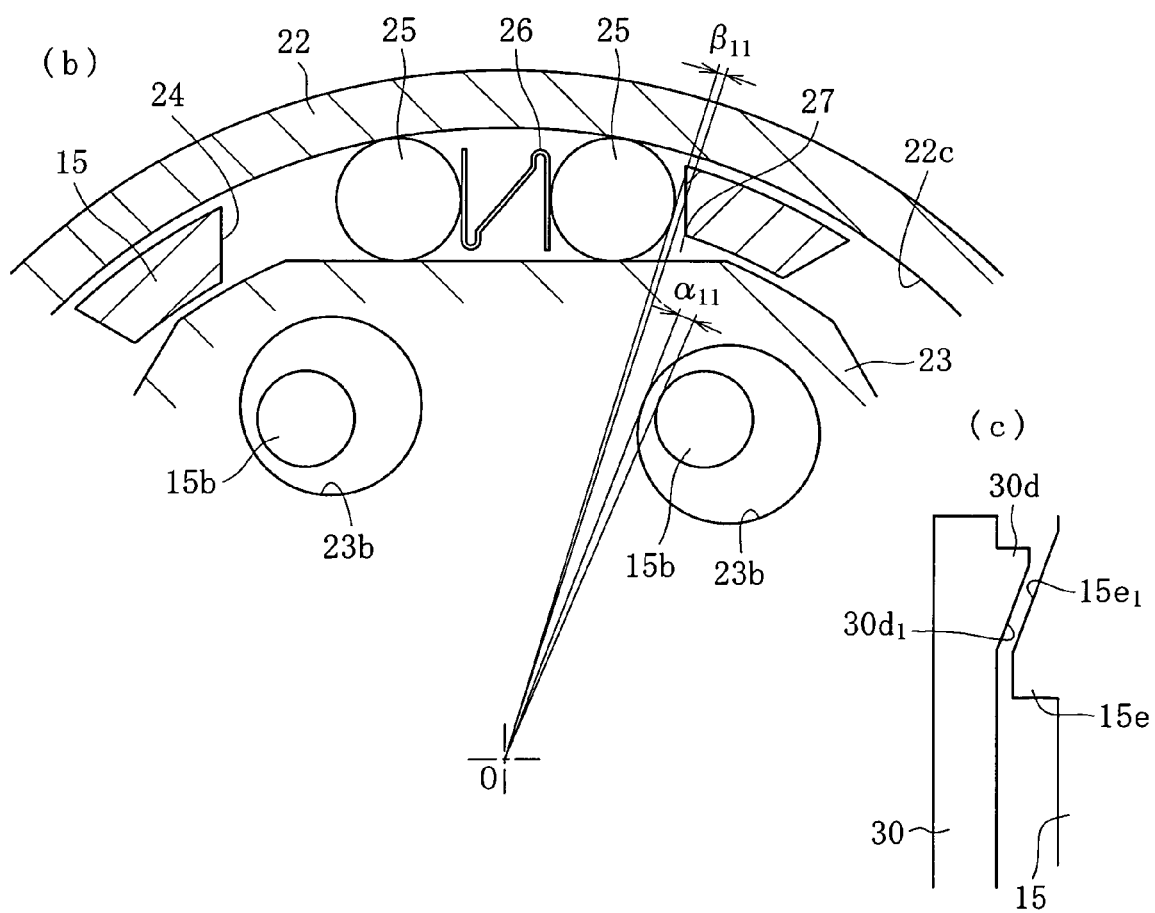
Figure 22:
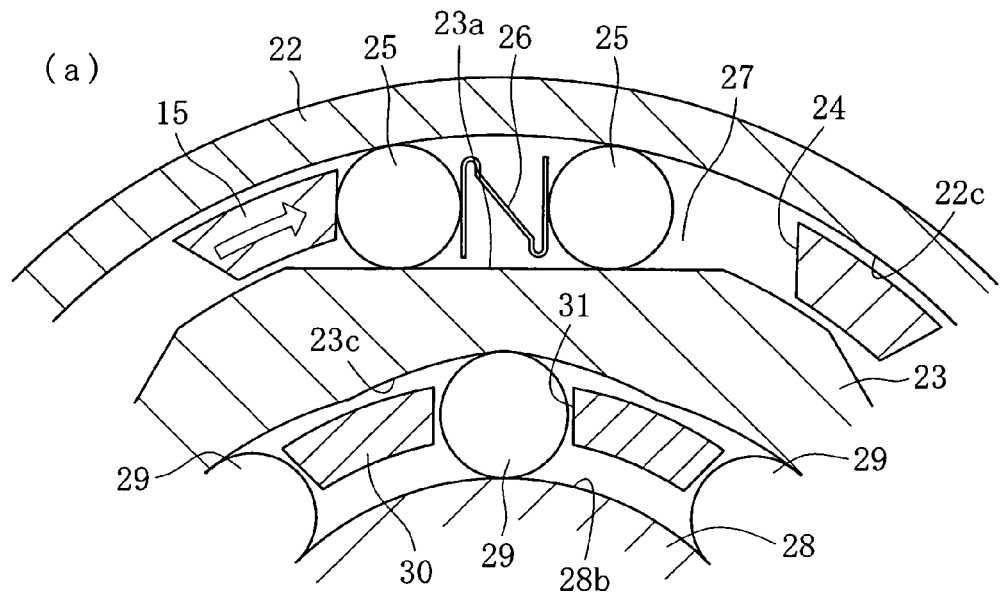
Figure 22:
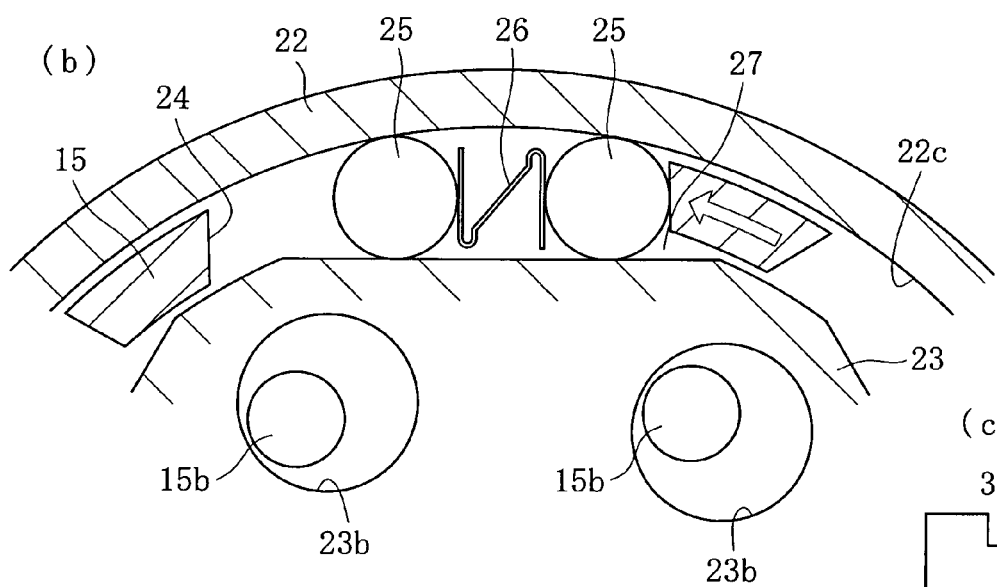
Figure 22:
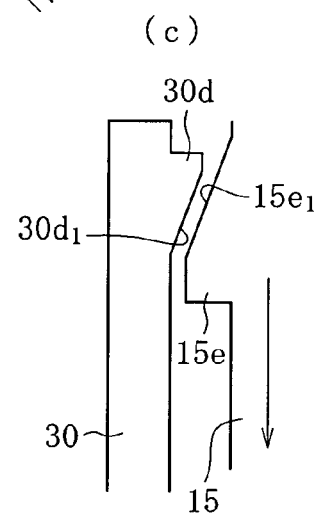
Figure 23:
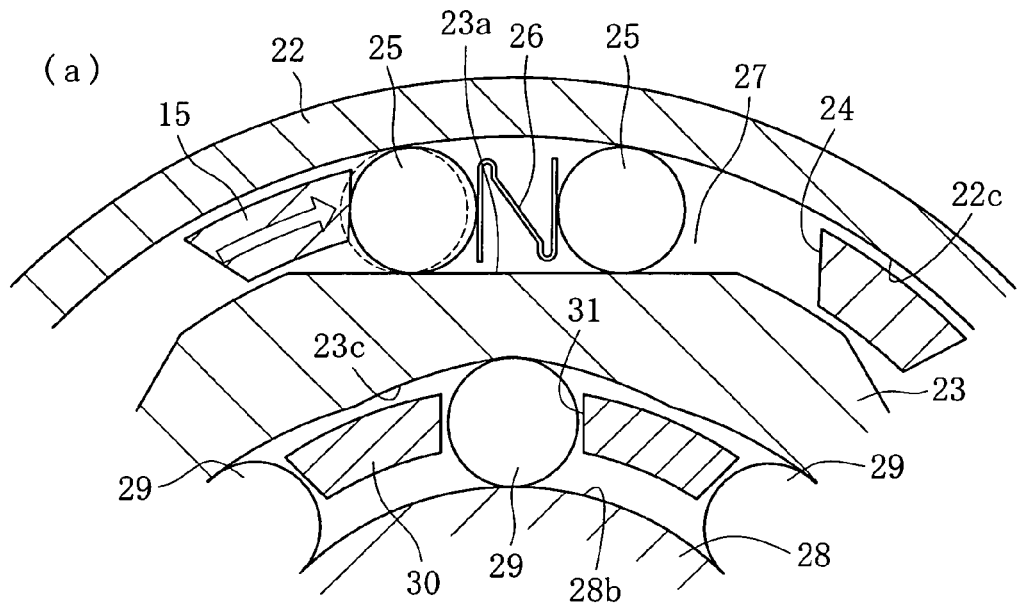
Figure 23:
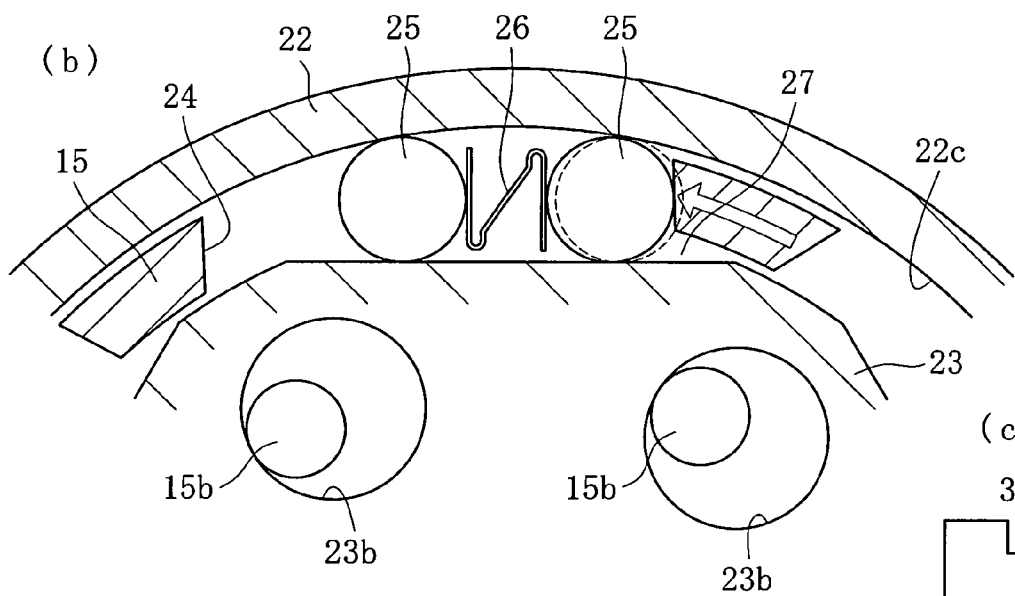
Figure 23:
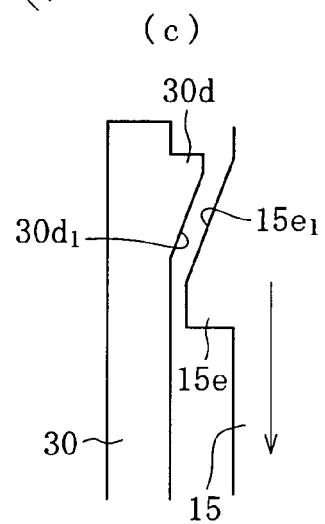

FIG. 21 shows a neutral state in which no pumping operation is performed on the lever 41*a*, FIG. 22 shows the state in which pumping operation on the lever 41*a* is started, and FIG. 23 shows the state in which pumping operation is further performed on the lever 41*a*. In each drawing, portion (a) is an enlarged sectional view taken along the line D-D of FIG. 1, portion (b) is an enlarged sectional view taken along the line C-C of FIG. 1, and portion (c) is a diagram schematically illustrating the operation of the torque cam portion 30*d* of the retainer 30 and the torque cam portion 15*e* of the inner ring 15.

First, when pumping operation is performed on the lever 41*a* counterclockwise (upwardly), in the lever side clutch section 11, the rotational torque from the outer ring 14 due to the pumping operation of the lever 41*a* is transmitted to the inner ring 15, and, in the brake side clutch section 12, the inner ring 15 is engaged with the cylindrical rollers 25 to press against the elastic force of the plate spring 26 due to the rotation of the inner ring 15, whereby the cylindrical rollers 25 are detached from the wedge gap 27, and the locked state of the output shaft 23 is canceled, making the output shaft 23 rotatable. When the inner ring 15 further rotates, the pins 15*b* of the inner ring 15 are engaged with the pin holes 23b of the output shaft 23, whereby the input torque from the inner ring 15 is transmitted to the output shaft 23 via the pins 15b and the pin holes 23b, thereby rotating the output shaft 23.

At this time, the protrusion 30c of the retainer 30 is fit-engaged with the recess 23h of the output shaft 23 for phase matching with the output shaft 23, so that the retainer 30 does not rotate. As a result, the torque cam portion 15e of the inner ring 15, which has been opposed to the torque cam portion 30d of the retainer 30, moves away therefrom in the circumferential direction. Thus, the tapered rollers 29 remain engaged with the output shaft 23 and the pinion shaft 28, with the retainer 30 being pressed in the axial direction by the wave washer 33. Since the pinion shaft 28 thus remains engaged with the output shaft 23, the pinion shaft 28 also rotates with the rotation of the output shaft 23, so that the pinion shaft 28 rotates by inching through pumping operation of the lever 41a.

Figure 24:
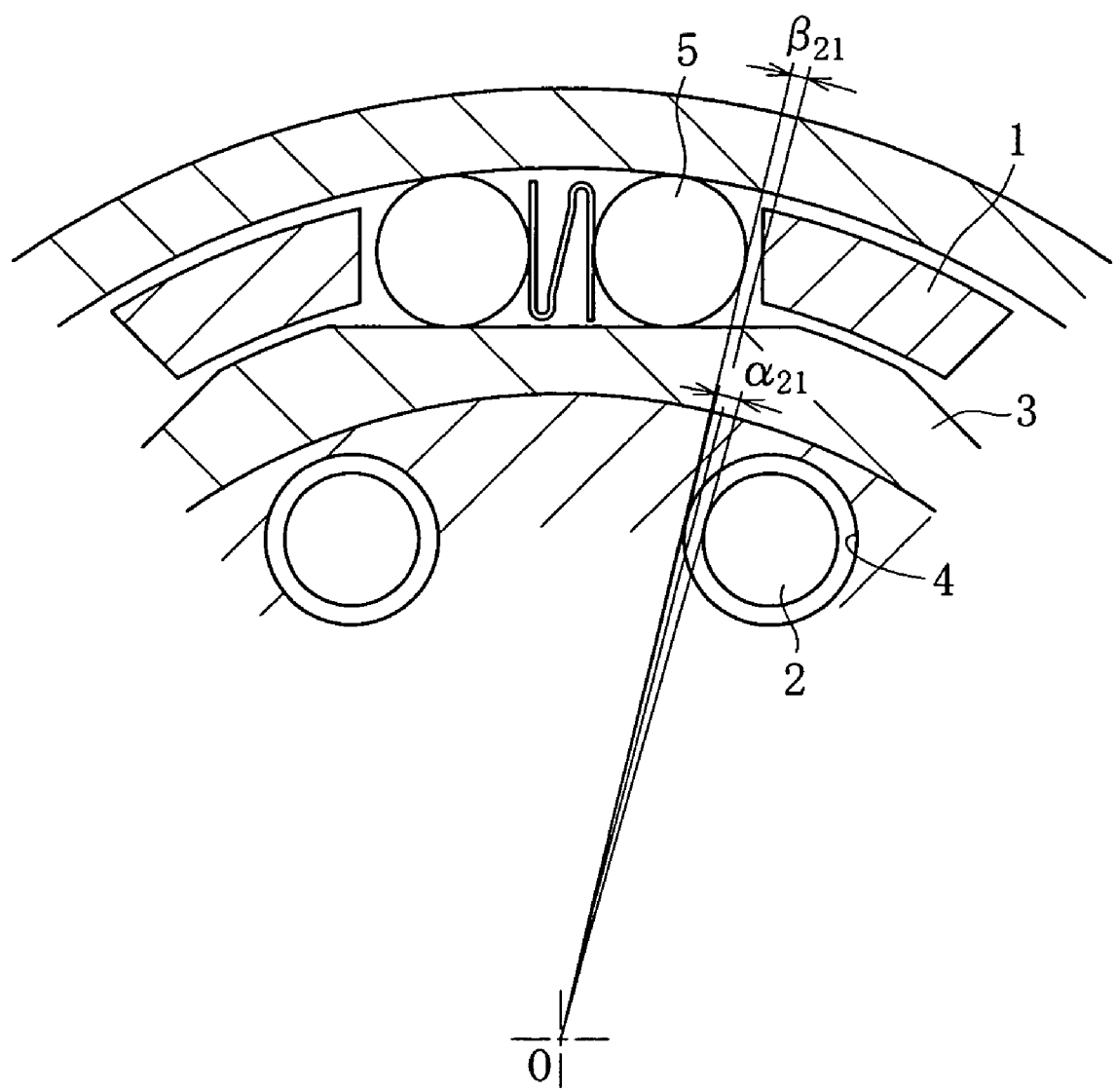
FIG. 24 is a main portion enlarged sectional view showing a conventional product for comparison with FIG. 21(b).

In the neutral state as shown in FIG. 21(b), the clearance angle $\alpha_{11}$ made by the two contact points (counterclockwise side) of the pin 15b of the inner ring 15 and the pin hole 23b of the output shaft 23 and the clearance angle $\beta_{11}$ made by the two contact points of the inner ring 15 and the cylindrical roller 25 with respect to the rotation center O are respectively set to be equal to the clearance angle $\alpha_{21}$ made by the two contact points (counterclockwise side) of the pin 2 of the inner ring 1 and the pin hole 4 of the output shaft 3 and the clearance angle $\beta_{21}$ made by the two contact points of the inner ring 1 and the cylindrical roller 5 with respect to the rotation center O in the conventional clutch unit shown in FIG. 24 (see Patent Document 1) ($\alpha_{11}=\alpha_{21}$, $\beta_{11}=\beta_{21}$).

Figure 25:
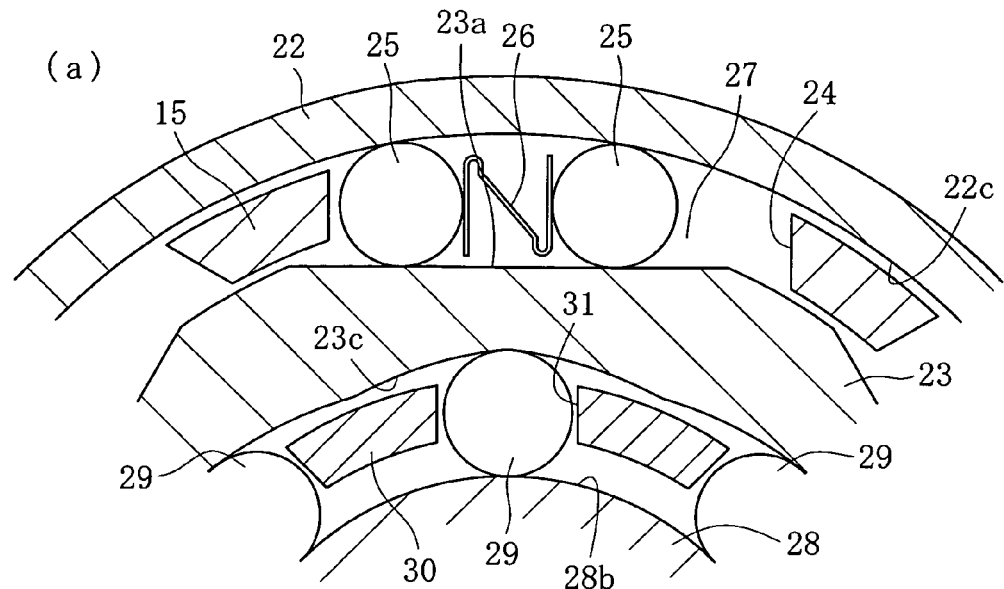
Figure 25:
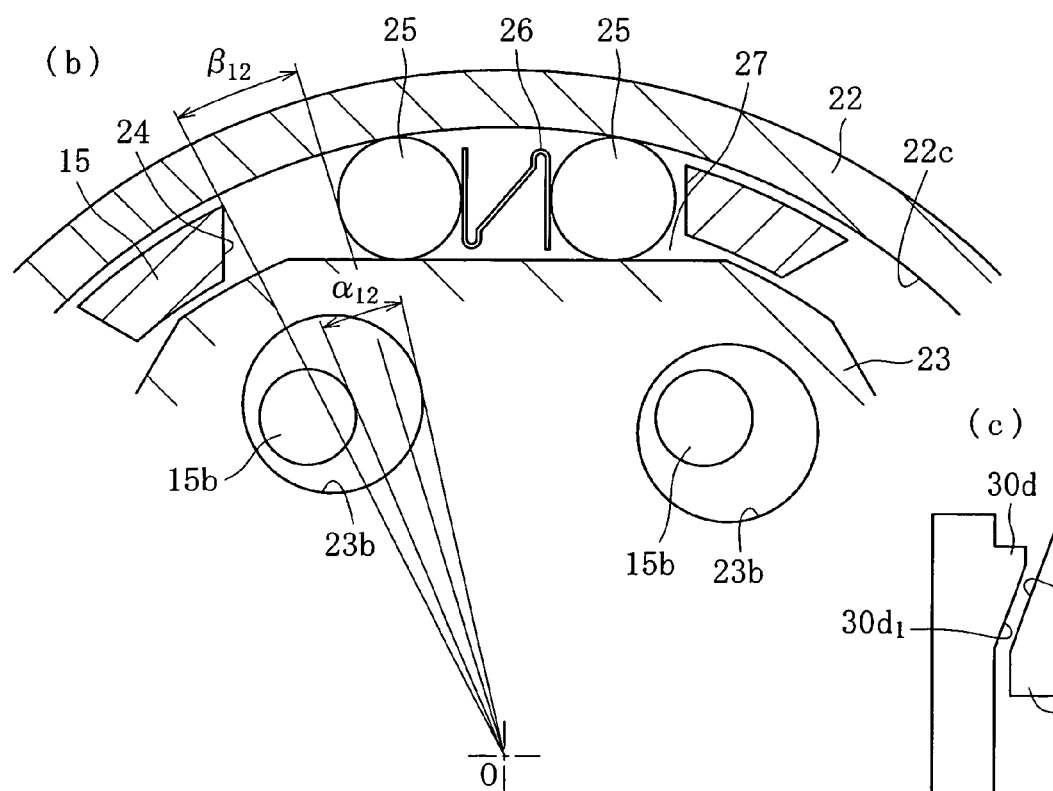
Figure 25:
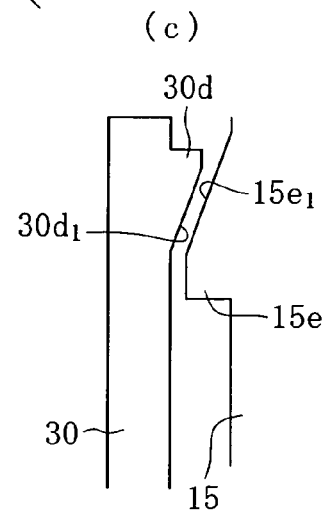
Figure 26:
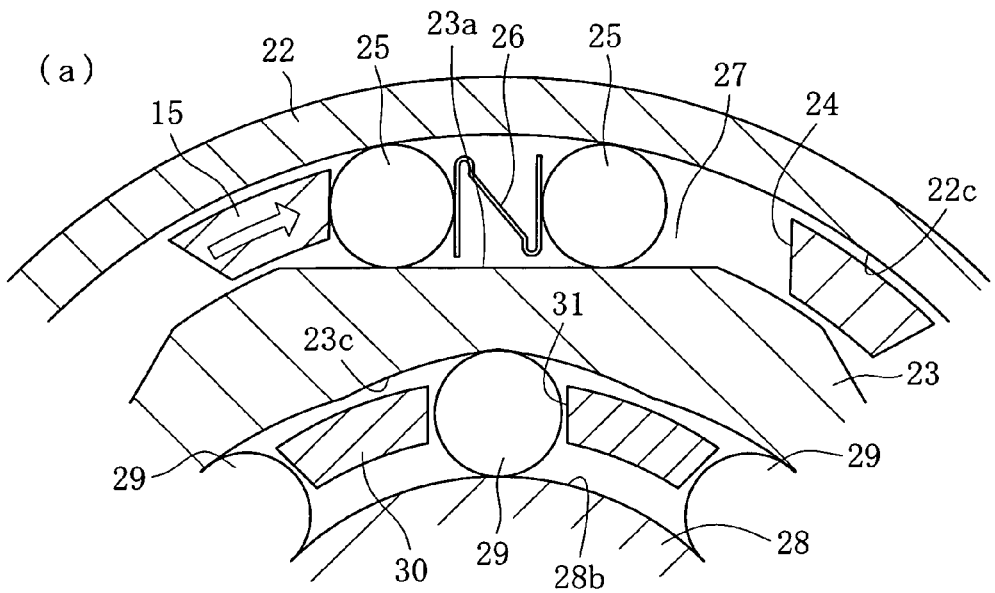
Figure 26:
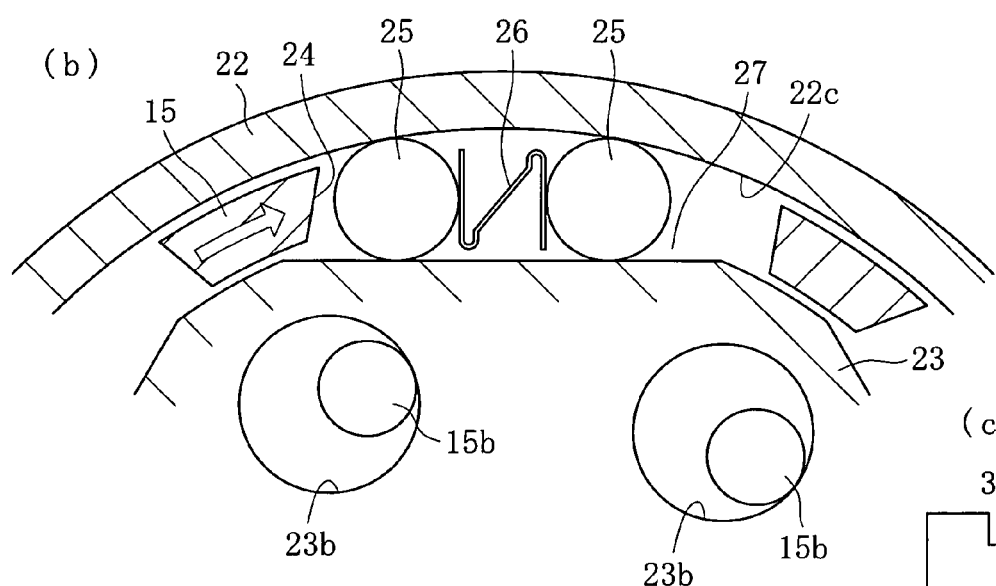
Figure 26:
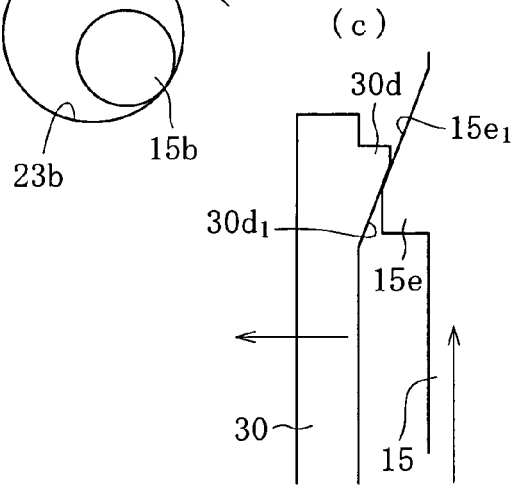

Next, FIG. 25 shows the neutral state in which the lever 41a is not operated, and FIG. 26 shows the state in which a single operation of lever 41a is started. In each drawing, portion (a) is an enlarged sectional view taken along the line D-D of FIG. 1, portion (b) is an enlarged sectional view taken along the line C-C of FIG. 1, and portion (c) is a diagram schematically illustrating the operating state of the torque cam portion 30d of the retainer 30 and the torque cam portion 15e of the inner ring 15.

Figure 27:
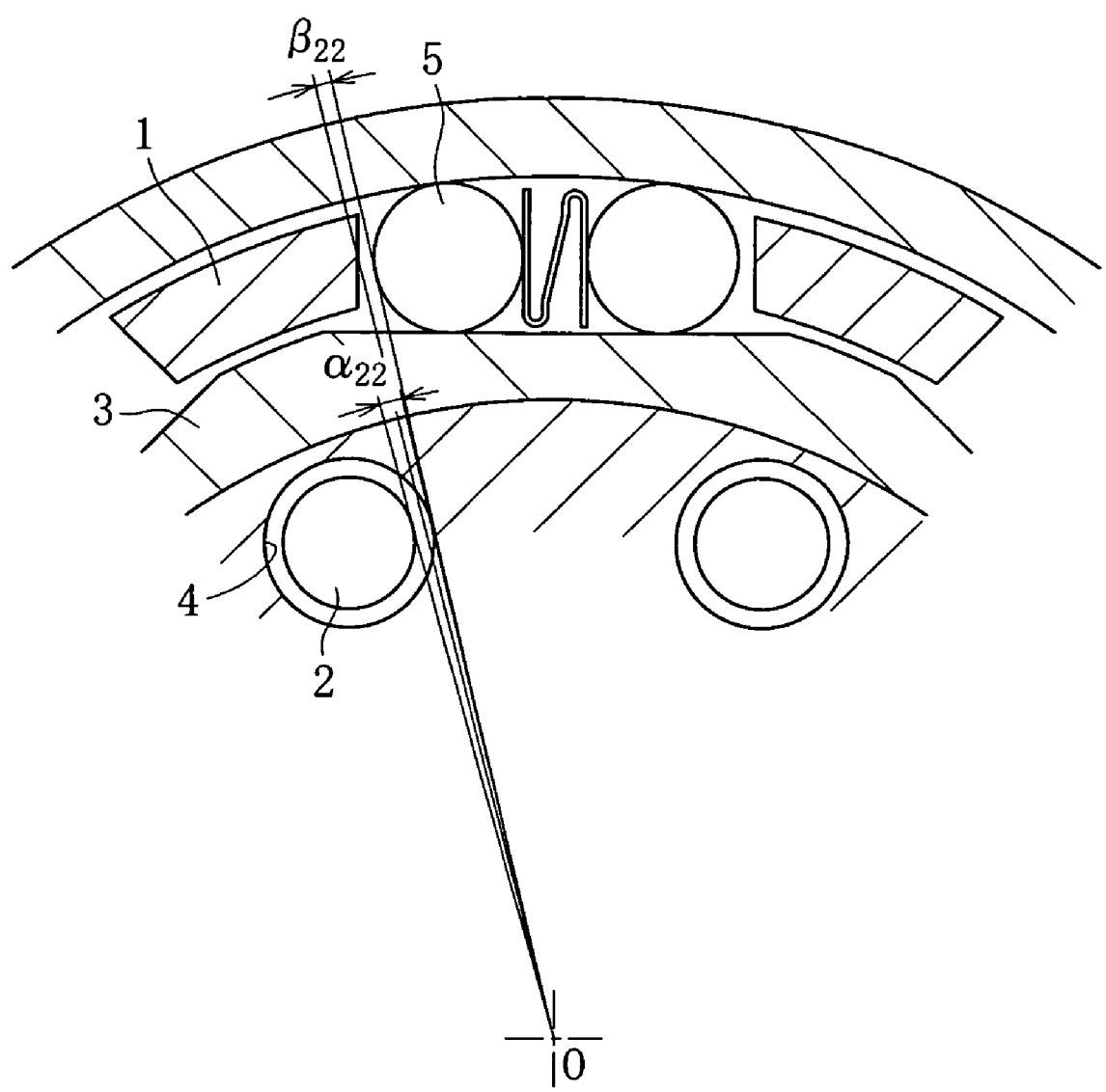
FIG. 27 is a main portion enlarged sectional view showing a conventional product for comparison with FIG. 25(b).

In the neutral state as shown in FIG. 25(b), the clearance angle $\alpha_{12}$ made by the two contact points (clockwise side) of the pin 15b of the inner ring 15 and the pin hole 23b of the output shaft 23 and the clearance angle $\beta_{12}$ made by the two contact points of the inner ring 15 and the cylindrical roller 25 with respect to the rotation center O are respectively set to be larger than the clearance angle $\alpha_{22}$ made by the two contact points (clockwise side) of the pin 2 of the inner ring 1 and the pin hole 4 of the output shaft 3 and the clearance angle $\beta_{22}$ made by the two contact points of the inner ring 1 and the cylindrical roller 5 with respect to the rotation center O in the conventional clutch unit shown in FIG. 27 (see Patent Document 1) ($\alpha_{12}>\alpha_{22}$, $\beta_{12}>\beta_{22}$).

For example, in the conventional clutch unit (see Patent Document 1), the clearance angle $\alpha_{22}$ made by the two contact points (clockwise side) of the pin 2 of the inner ring 1 and the pin hole 4 of the output shaft 3 is from 1.8 to 2.5 degrees, whereas, in the clutch unit of the embodiment, the clearance angle $\alpha_{12}$ made by the two contact points (clockwise side) of the pin 15b of the inner ring 15 and the pin hole 23b of the output shaft 23 is set to 10 degrees. Further, in the conventional clutch unit (see Patent Document 1), the clearance angle $\beta_{22}$ made by the two contact points of the inner ring 1 and the cylindrical roller 5 (the clockwise side) is from 0.5 to 1.5 degrees, whereas, in the clutch unit of the embodiment, the clearance angle $\beta_{12}$ made by the two contact points of the inner ring 15 and the cylindrical roller 25 is set to 12 degrees.

In the conventional clutch unit, the clearance angle $\alpha_{21}$ made by the two contact points (counterclockwise side) of the pin 2 of the inner ring 1 and the pin hole 4 of the output shaft 3 and the clearance angle $\beta_{21}$ made by the two contact points of the inner ring 1 and the cylindrical roller 5, are respectively equivalent to the clearance angle $\beta_{22}$ made by the two contact points (clockwise side) of the pin 2 of the inner ring 1 and the pin hole 4 of the output shaft 3 and the clearance angle $\beta_{22}$ made by the two contact points of the inner ring 1 and the cylindrical roller 5 ($\alpha_{21}=\alpha_{22}$, $\beta_{21}=\beta_{22}$).

When, in the above-described structure, a single operation is performed on the lever 41a clockwise, in the lever side clutch section 11, the rotational torque from the outer ring 14 due to the single operation of the lever 41a is transmitted to the inner ring 15 to rotate the inner ring 15. On the other hand, in the brake side clutch section 12, until the pins 15b of the inner ring 15 come into contact with the pin holes 23b of the output shaft 23, that is, while the pins 15b of the inner ring 15 rotates, for example, by 10 degrees, the torque cam portion 15e of the inner ring 15, which has been opposed to the torque cam portion 30d of the retainer 30, moves to close proximity thereto along the circumferential direction, and the cam surface $15e_1$ of the torque cam portion 15e of the inner ring 15 moves relative to the cam surface $30d_1$ of the torque cam portion 30 of the retainer 30. As a result, the retainer 30 moves in the axial direction and, at the same time, the tapered rollers 29 accommodated in the pockets 31 of the retainer 30 move to cancel the engagement of the output shaft 23 and the pinion shaft 28. Through the canceling of this engagement, the pinion shaft 28 is made rotatable. For example, when torque is being applied to the pinion shaft 28 in the rotating direction thereof, the pinion shaft 28 makes a one-stroke rotation in that direction.

By thus disposing the rotation control clutch section 13 adjacent to the brake side clutch section 12, it is not only possible to rotate the pinion shaft 28 by inching through counterclockwise (upward) pumping operation of the lever 41a but also to make the pinion shaft 28 rotatable through a single clockwise (downward) operation of the lever 41a. When this clutch unit is used in a seat lifter portion of an automobile, the height of the surface of the seating seat 40a is increased through rotation by inching of the pinion gear 28a through counterclockwise (upward) pumping operation of the lever 41a, and the surface of the seating seat 40a to which a load is being applied in the rotating direction thereof is reduced in height by a one-stroke rotation of the pinion gear 28a through clockwise (downward) single operation of the lever 41a. In this way, at the time of a clockwise (downward) single operation of the lever 41a, it is possible to cause the pinion shaft 28 to make a one-stroke rotation through a single lever operation, so that the complication in lever operation is eliminated, thereby achieving an improvement in terms of seat lever operability.

The invention claimed is:

1. A seat having a seat adjustment device for performing position adjustment on a seating seat, said seat adjustment device comprising:
   a lever capable of torque input;
   a movement mechanism having a rotary mechanism, and being configured to enable adjustment movement of a desired portion of the seating seat; and
   a clutch unit disposed between said lever and said rotary member of said movement mechanism,
   wherein said clutch unit comprises a lever side clutch section disposed on an input side and being configured to control transmission/interruption of rotational torque to an output side through a lever operation, a brake side clutch section disposed on the output side and being configured to transmit input torque from said lever side clutch section to the output side and to interrupt reverse input torque from the output side, and a rotation control clutch section disposed adjacent to said brake side clutch section and being configured to rotate by inching an output side member of said brake side clutch section through a pumping operation in which said lever is rotated in one direction and enables said output side member of said brake side clutch section to be rotatable through a single operation in which said lever is rotated in the opposite direction, wherein said rotation control clutch section has a control device configured to divide said output side member into a first output side member and a second output side member and is configured to control transmission/interruption of torque between said first output side member and said second output side member, and wherein, in a neutral state of said brake side clutch section, a clearance angle made by two contact points of an input side member and said output side member with respect to a rotation center, and a clearance angle made by two contact points of said input side member and an engagement member with respect to the rotation center, are larger in one rotating direction than in the other rotating direction.

2. A seat according to claim 1, wherein, in said rotation control clutch section, a tapered roller is disposed between said first output side member and said second output side member so as to enable engagement/disengagement, and wherein said control device is configured to control the engagement/disengagement of the tapered roller.

3. A seat according to claim 2, wherein said tapered roller is disposed so as to be axially movable between said first output side member and said second output side member, and is capable of undergoing engagement/disengagement through axial movement in a wedge gap formed so as to extend in the axial direction.

4. A seat according to claim 3, wherein said engagement member is one of a plurality of engagement members, and said lever side clutch section comprises said input side member to which torque is input through a lever operation, said output side member from which torque is output, said plurality of engagement members configured to control transmission/interruption of input torque from said input side member through engagement/disengagement between said input side member and said output side member, a retainer configured to retain said engagement members at predetermined circumferential intervals, a stationary side member constrained in rotation, a first elastic member which disposed between said retainer and said stationary side member and configured to accumulate elastic force with the input torque from said input side member and restore said retainer to the neutral state with the accumulated elastic force through releasing of the input torque, and a second elastic member disposed between said input side member and said stationary side member and configured to accumulate elastic force with the input torque from said input side member and restore said input side member to the neutral state with the accumulated elastic force through releasing of the input torque.

5. A seat according to claim 3, wherein said engagement member is one of a pair of engagement members, and said brake side clutch section comprises said input side member to which torque is input, said output side member from which torque is output, a stationary side member constrained in rotation, said pair of engagement members which are arranged in a gap between the stationary side member and said output side member, and is configured to control transmission of input torque from said input side member and interruption of reverse input torque from said output side member through engagement/disengagement between said stationary side member and said output side member, and an elastic member is disposed between said pair of engagement members, and is capable of imparting a repulsive urging force to said engagement members.

6. A seat according to claim 2, wherein said control device comprises a retainer having a torque cam portion configured to move said tapered roller in the axial direction, and an input side member of said brake side clutch section having a torque cam portion in phase with said torque cam portion of said retainer.

7. A seat according to claim 2, wherein said engagement member is one of a plurality of engagement members, and said lever side clutch section comprises said input side member to which torque is input through a lever operation, said output side member from which torque is output, said plurality of engagement members configured to control transmission/interruption of input torque from said input side member through engagement/disengagement between said input side member and said output side member, a retainer configured to retain said engagement members at predetermined circumferential intervals, a stationary side member constrained in rotation, a first elastic member disposed between said retainer and said stationary side member and configured to accumulate elastic force with the input torque from said input side member and restore said retainer to the neutral state with the accumulated elastic force through releasing of the input torque, and a second elastic member disposed between said input side member and said stationary side member and configured to accumulate elastic force with the input torque from said input side member and restore said input side member to the neutral state with the accumulated elastic force through releasing of the input torque.

8. A seat according to claim 2, wherein said engagement member is one of a pair of engagement members, and said brake side clutch section comprises said input side member to which torque is input, said output side member from which torque is output, a stationary side member constrained in rotation, said pair of engagement members which are arranged in a gap between the stationary side member and said output side member, and is configured to control transmission of input torque from said input side member and interruption of reverse input torque from said output side member through engagement/disengagement between said stationary side member and said output side member, and an elastic member is disposed between said pair of engagement members, and is capable of imparting a repulsive urging force to said engagement members.

9. A seat according to claim 1, wherein said control device comprises a retainer having a torque cam portion configured to move said tapered roller in the axial direction, and an input side member of said brake side clutch section having a torque cam portion in phase with said torque cam portion of said retainer.

10. A seat according to claim 9, wherein said engagement member is one of a plurality of engagement members, and said lever side clutch section comprises said input side member to which torque is input through a lever operation, said output side member from which torque is output, said plurality of engagement members configured to control transmission/interruption of input torque from said input side member through engagement/disengagement between said input side member and said output side member, a retainer configured to retain said engagement members at predetermined circumferential intervals, a stationary side member constrained in rotation, a first elastic member disposed between said retainer and said stationary side member and configured to accumulate elastic force with the input torque from said input side member and restore said retainer to the neutral state with the accumulated elastic force through releasing of the input torque, and a second elastic member disposed between said input side member and said stationary side member and configured to accumulate elastic force with the input torque from said input side member and restore said input side member to the neutral state with the accumulated elastic force through releasing of the input torque.

11. A seat according to claim 9, wherein said engagement member is one of a pair of engagement members, and said brake side clutch section comprises said input side member to which torque is input, said output side member from which torque is output, a stationary side member constrained in rotation, said pair of engagement members which are arranged in a gap between the stationary side member and said output side member, and is configured to control transmission of input torque from said input side member and interruption of reverse input torque from said output side member through engagement/disengagement between said stationary side member and said output side member, and an elastic member is disposed between said pair of engagement members, and is capable of imparting a repulsive urging force to said engagement members.

12. A seat according to claim 1, wherein said engagement member is one of a plurality of engagement members, and said lever side clutch section comprises said input side member to which torque is input through a lever operation, said output side member from which torque is output, said plurality of engagement members configured to control transmission/interruption of input torque from said input side member through engagement/disengagement between said input side member and said output side member, a retainer configured to retain said engagement members at predetermined circumferential intervals, a stationary side member constrained in rotation, a first elastic member disposed between said retainer and said stationary side member and configured to accumulate elastic force with the input torque from said input side member and restore said retainer to the neutral state with the accumulated elastic force through releasing of the input torque, and a second elastic member disposed between said input side member and said stationary side member and configured to accumulate elastic force with the input torque from said input side member and restore said input side member to the neutral state with the accumulated elastic force through releasing of the input torque.

13. A seat according to claim 1, wherein said engagement member is one of a pair of engagement members, and said brake side clutch section comprises said input side member to which torque is input, said output side member from which torque is output, a stationary side member constrained in rotation, said pair of engagement members arranged in a gap between said stationary side member and said output side member, and is configured to control transmission of input torque from said input side member and interruption of reverse input torque from said output side member through engagement/disengagement between said stationary side member and said output side member, and an elastic member is disposed between said pair of engagement members, and is capable of imparting a repulsive urging force to said engagement members.

14. A seat according to claim 1, wherein said engagement member is one of a plurality of engagement members, and said plurality of engagement members is one of a plurality of cylindrical rollers and balls.

\* \* \* \* \*